US012795453B2

(12) United States Patent
Veluchamy et al.

(10) Patent No.: US 12,795,453 B2
(45) Date of Patent: Nov. 10, 2026

(54) IMPLEMENTING A DYNAMICAL ANTENNA ARRAY RECONFIGURATION IN A TELECOMMUNICATIONS NETWORK

(71) Applicants: RAKUTEN MOBILE, INC., Tokyo (JP); Rakuten Symphony, Inc., Tokyo (JP)

(72) Inventors: Lingasamy Veluchamy, Tokyo (JP); Awn Muhammad, Tokyo (JP)

(73) Assignees: RAKUTEN MOBILE, INC., Tokyo (JP); RAKUTEN SYMPHONY, INC., Tokyo (JP)

( * ) Notice: Subject to any disclaimer, the term of this patent is extended or adjusted under 35 U.S.C. 154(b) by 297 days.

(21) Appl. No.: 18/687,478

(22) PCT Filed: Dec. 27, 2023

(86) PCT No.: PCT/US2023/085999
§ 371 (c)(1),
(2) Date: Feb. 28, 2024

(87) PCT Pub. No.: WO2024/145336
PCT Pub. Date: Jul. 4, 2024

(65) Prior Publication Data

US 2025/0132796 A1 Apr. 24, 2025

(30) Foreign Application Priority Data

Dec. 28, 2022 (IN) ............................ 202221076397
Feb. 3, 2023 (IN) ............................ 202321007046
(Continued)

(51) Int. Cl.
*H04W 28/18* (2009.01)
*H04B 7/06* (2006.01)
(Continued)

(52) U.S. Cl.
CPC .......... *H04W 28/18* (2013.01); *H04B 7/0608* (2013.01); *H04B 7/0628* (2013.01);
(Continued)

(58) Field of Classification Search
CPC . H04W 18/18; H04W 28/0215; H04W 48/16; H04W 52/0206; H04B 17/12;
(Continued)

(56) References Cited

U.S. PATENT DOCUMENTS 10,916,315 B2 * 2/2021 Yu ........................ G11C 7/1078
11,570,761 B2 * 1/2023 Ryu ................... H04B 7/06956
(Continued)

FOREIGN PATENT DOCUMENTS

WO 2024/024423 A1 2/2024
WO WO-2024102280 A1 * 5/2024 ........ H04W 28/0257
WO WO-2024145340 A1 * 7/2024 .......... H04W 88/085

OTHER PUBLICATIONS

Johan Von Perner et al., 'Network energy efficiency', NGMN Alliance, Dec. 7, 2021, V1.1 (56 pages).
(Continued)

*Primary Examiner* — Hai V Nguyen
(74) *Attorney, Agent, or Firm* — Sughrue Mion, PLLC

(57) ABSTRACT

The present disclosure relates to implementing a dynamical antenna array reconfiguration within an O-RAN, wherein a radio unit (O-RU), the O-RU configured to send, to a distributed unit (O-DU), configuration capability information via management plane (M-Plane) messaging; receive, from the O-DU, an antenna array configuration supported by the O-RU via control plane (C-Plane) messaging, wherein the supported antenna array configuration is based on the configuration capability information of the O-RU and a request to reconfigure the antenna array from the higher-layer network function; an based on the supported antenna
(Continued)

array configuration for the O-RU, reconfigure the antenna array configuration of the O-RU.

20 Claims, 10 Drawing Sheets

(30) Foreign Application Priority Data

| | | |
|---|---|---|
| Mar. 10, 2023 | (IN) | 202321016149 |
| Mar. 31, 2023 | (IN) | 202341024486 |
| May 4, 2023 | (IN) | 202341031813 |

(51) Int. Cl.

| | |
|---|---|
| ***H04B 7/08*** | (2006.01) |
| ***H04B 17/12*** | (2015.01) |
| ***H04B 17/21*** | (2015.01) |
| ***H04L 41/08*** | (2022.01) |
| ***H04L 41/0816*** | (2022.01) |
| ***H04L 41/0853*** | (2022.01) |
| ***H04W 28/02*** | (2009.01) |
| ***H04W 48/16*** | (2009.01) |
| ***H04W 52/02*** | (2009.01) |

(52) U.S. Cl.

CPC ......... *H04B 7/0691* (2013.01); *H04B 7/0802* (2013.01); *H04B 17/12* (2015.01); *H04B 17/221* (2023.05); *H04L 41/08* (2013.01); *H04L 41/0816* (2013.01); *H04L 41/0853* (2013.01); *H04W 28/0215* (2013.01); *H04W 48/16* (2013.01); *H04W 52/0206* (2013.01)

(58) Field of Classification Search

CPC .. H04B 17/221; H04B 7/0608; H04B 7/0628; H04B 7/0691; H04B 7/0802; H04L 41/08; H04L 41/0816; H04L 41/0853

See application file for complete search history.

(56) References Cited

U.S. PATENT DOCUMENTS

| | | | | |
|---|---|---|---|---|
| 11,601,819 | B2 * | 3/2023 | Chou | H04W 24/02 |
| 11,627,562 | B2 * | 4/2023 | Ryu | H04B 7/06956 370/329 |
| 11,917,527 | B2 * | 2/2024 | Chou | H04W 48/18 |
| 11,985,515 | B2 * | 5/2024 | Raghavan | H04B 7/0691 |
| 12,200,498 | B2 * | 1/2025 | Chou | H04W 16/10 |
| 12,382,416 | B2 * | 8/2025 | Song | H04W 8/18 |
| 12,501,417 | B2 | 12/2025 | Guchhait et al. | |
| 2020/0258583 | A1 * | 8/2020 | Yu | G11C 7/106 |
| 2020/0329381 | A1 * | 10/2020 | Chou | H04W 24/02 |
| 2020/0358583 | A1 * | 11/2020 | Ryu | H04B 7/06956 |
| 2021/0120538 | A1 | 4/2021 | Huh et al. | |
| 2021/0136598 | A1 * | 5/2021 | Raghavan | H04B 7/0691 |
| 2021/0136788 | A1 | 5/2021 | Lim et al. | |
| 2021/0195517 | A1 | 6/2021 | Yang et al. | |
| 2021/0258866 | A1 * | 8/2021 | Chou | H04W 24/02 |
| 2021/0385686 | A1 | 12/2021 | Ahmed et al. | |
| 2022/0077587 | A1 | 3/2022 | Wu et al. | |
| 2022/0159525 | A1 * | 5/2022 | Chou | H04W 24/02 |
| 2022/0225264 | A1 * | 7/2022 | Song | H04W 8/18 |
| 2022/0232508 | A1 * | 7/2022 | Song | H04W 16/18 |
| 2022/0394680 | A1 * | 12/2022 | Kim | H04L 1/08 |
| 2023/0045847 | A1 | 2/2023 | Wong et al. | |
| 2023/0133083 | A1 * | 5/2023 | Song | H04W 60/00 455/435.1 |
| 2023/0144337 | A1 | 5/2023 | Kumar et al. | |
| 2023/0189006 | A1 * | 6/2023 | Chou | H04W 24/02 370/328 |
| 2023/0284048 | A1 * | 9/2023 | O'Shea | H04B 17/336 370/329 |
| 2023/0402766 | A1 * | 12/2023 | Garyantes | H04B 7/0691 |
| 2024/0063851 | A1 | 2/2024 | Sachidanand Sinha et al. | |
| 2024/0073815 | A1 | 2/2024 | Farhoodi et al. | |
| 2024/0107443 | A1 | 3/2024 | Singh et al. | |
| 2024/0129876 | A1 | 4/2024 | Sarma et al. | |
| 2024/0155393 | A1 * | 5/2024 | Han | H04W 24/10 |
| 2024/0205690 | A1 * | 6/2024 | Kurian | H04W 72/52 |
| 2024/0214927 | A1 * | 6/2024 | Garyantes | H04W 72/0446 |
| 2024/0224305 | A1 * | 7/2024 | Kang | H04W 72/50 |
| 2024/0250904 | A1 * | 7/2024 | Shete | H04L 45/505 |
| 2024/0259061 | A1 * | 8/2024 | Abotabl | H04B 7/0626 |
| 2024/0276188 | A1 * | 8/2024 | Shete | H04W 4/50 |
| 2024/0283507 | A1 * | 8/2024 | Ly | H04B 7/0482 |
| 2024/0357479 | A1 * | 10/2024 | Bhaskaran | H04W 28/0289 |
| 2024/0421867 | A1 | 12/2024 | Huang et al. | |
| 2025/0008378 | A1 * | 1/2025 | Veluchamy | H04B 7/0608 |
| 2025/0048251 | A1 * | 2/2025 | Shete | H04W 52/0203 |
| 2025/0184278 | A1 * | 6/2025 | Nesteroff | H04L 41/0894 |
| 2025/0203505 | A1 * | 6/2025 | Muhammad | H04W 52/0203 |
| 2025/0247291 | A1 * | 7/2025 | Shete | H04L 41/0813 |

OTHER PUBLICATIONS

O-RAN Alliance, "O-RAN Working Group 4 (Open Fronthaul Interfaces WG) Management Plane Specification", 2022, O-RAN. WG4.MP.0-v10.00, Technical Specification, (260 pages).

O-RAN Alliance, "O-RAN Work Group 1 (Use Cases and Overall Architecture) Network Energy Saving Use Cases Technical Report", 2023, O-RAN.WG1.NESUC-R003-v01.00, Technical Report, (65 pages).

O-RAN Alliance, "O-RAN Working Group 1 Use Cases Analysis Report", 2022, O-RAN.WG1.Use-Cases-Analysis-Report-v09.00, Technical Report, (65 pages).

O-RAN Alliance, "O-RAN Working Group 4 (Open Fronthaul Interfaces WG) Control, User and Synchronization Plane Specification", 2022, O-RAN.WG4.CUS.0-R003-v11.00, Technical Specification, (6 pages).

Lee, et al., "Design of a Management Plane for 5G Open Fronthaul Interface", IEEE, ICTC 2020, pp. 946-948 (3 pages).

* cited by examiner

IMPLEMENTING A DYNAMICAL ANTENNA ARRAY RECONFIGURATION IN A TELECOMMUNICATIONS NETWORK

CROSS-REFERENCE TO RELATED APPLICATION(S)

This application is based on and claims priorities from Indian Provisional Patent Application No. 202221076397 filed on Dec. 28, 2022, Indian Provisional Patent Application No. 202341031813 filed on May 4, 2023, Indian Provisional Patent Application No. 202321007046 filed Feb. 3, 2023, Indian Provisional Patent Application No. 202321016149 filed on Apr. 10, 2023, and Indian Provisional Patent Application No. 202341024486 filed on Apr. 31, 2023, all the disclosures of which are incorporated by reference herein in their entireties.

TECHNICAL FIELD

The present disclosure relates to the implementation of a dynamical antenna array reconfiguration within an open radio access network (O-RAN) to save energy in a telecommunications network.

BACKGROUND

A radio access network (RAN) is an important component in a telecommunications system, as it connects end-user devices (or user equipment) to other parts of the network. The RAN includes a combination of various network elements (NEs) that connect the end-user devices to a core network. Traditionally, the hardware and/or software of a particular RAN is vendor specific.

Open RAN (O-RAN) technology has emerged to enable multiple vendors to provide hardware and/or software to a telecommunications system. To this end, O-RAN disaggregates the RAN functions into a centralized unit (CU), a distributed unit (DU), and a radio unit (RU). The CU is a logical node for hosting Radio Resource Control (RRC), Service Data Adaptation Protocol (SDAP), and/or Packet Data Convergence Protocol (PDCP) sublayers of the RAN. The DU is a logical node hosting Radio Link Control (RLC), Media Access Control (MAC), and Physical (PHY) sublayers of the RAN. An O-RU, i.e., the RU of an O-RAN, is a physical node that converts radio signals from antennas to digital signals that can be transmitted over the FrontHaul to an O-DU, i.e., a DU of an O-RAN. Because these entities have open protocols and interfaces between them, they can be developed by different vendors.

FIG. 1 illustrates a related art O-RAN architecture. Referring to FIG. 1, RAN functions in the O-RAN architecture are controlled and optimized by a Radio Access Network Intelligent Controller (RIC). The RIC is a software-defined component that implements modular applications to facilitate the multivendor operability required in the O-RAN system, as well as to automate and optimize RAN operations. The RIC is divided into two types: a non-real-time RIC (NRT-RIC) and a near-real-time RIC (nRT-RIC).

The NRT-RIC is the control point of a non-real-time control loop and operates on a timescale greater than 1 second within the Service Management and Orchestration (SMO) framework. Its functionalities are implemented through modular applications called rApps (rApp 1, . . . , rApp N), and include: providing policy-based guidance and enrichment across the A1 interface, which is the interface that enables the communication between the NRT-RIC and the nRT-RIC; performing data analytics; Artificial Intelligence/Machine Learning (AI/ML) training and inference for RAN optimization; and/or recommending configuration management actions over the O1 interface, which is the interface that connects the SMO to RAN managed elements (e.g., nRT-RIC, O-RAN Centralized Unit (O-CU), O-RAN Distributed Unit (O-DU), etc.).

The nRT-RIC operates on a timescale between 10 milliseconds and 1 second and connects to the O-DU, O-CU (disaggregated into the O-CU control plane (O-CU-CP) and the O-CU user plane (O-CU-UP)), and an open evolved NodeB (O-eNB) via the E2 interface. The nRT-RIC uses the E2 interface to control the underlying RAN elements (E2 nodes/network functions (NFs)) over a near-real-time control loop. The nRT-RIC monitors, suspends/stops, overrides, and controls the E2 nodes (O-CU, O-DU, and O-eNB) via policies. For example, the nRT-RIC sets policy parameters on activated functions of the E2 nodes. Further, the nRT-RIC hosts xApps to implement functions such as quality of service (QOS) optimization, mobility optimization, slicing optimization, interference mitigation, load balancing, security, etc. The two types of RICs work together to optimize the O-RAN. For example, the NRT-RIC provides, over the A1 interface, the policies, data, and artificial intelligence/machine learning AI/ML models enforced and used by the nRT-RIC for RAN optimization, and the nRT-RIC returns policy feedback (i.e., how the policy set by the NRT-RIC works).

The SMO framework, within which the NRT-RIC is located, manages and orchestrates RAN elements. Specifically, the SMO manages and orchestrates what is referred to as the O-RAN Cloud (O-Cloud). The O-Cloud is a collection of physical RAN nodes that host the RICs, O-CUs, and O-DUs, the supporting software components (e.g., the operating systems and runtime environments), and the SMO itself.

In the related art, the O-RU reports a rectangular coordinate system based standardized antenna array model and/or an antenna mask to the O-DU. The rectangular coordinate system based standardized antenna array model and/or an antenna mask is a hardcoded by the O-RU vendor as a read only. Moreover, the O-DU may be not aware of the internal architecture of O-RU, i.e., physical antenna element connection with Radio Frequency (RF) transceiver ports.

As a result, in the related art, muting (e.g., turning off) the part of antenna elements along with their respective RF transceiver chains is not possible.

SUMMARY

Example embodiments of the present disclosure relate to implementing a dynamical antenna array reconfiguration within an open radio access network (O-RAN) to save energy in a telecommunications network. Further, example embodiments provide a notification mechanism between the O-RU and the O-DU without significant changes of existing O-RAN management plane (M-Plane) and control user synchronization plane (CUS-Plane) specifications to execute and indicate a transition from one antenna array configuration to another antenna array configuration while allowing the O-RU to report its O-RU's configuration capability information (e.g., the O-RU internal architecture) to the O-DU and the O-DU to apply an antenna array configuration (e.g., either generated or predefined beam weights to the antenna models) in a manner supported by the configuration capability information of the O-RU. As a result, the antenna calibration requirements against each antenna array configuration are met and maximum energy saving can be achieved by muting physical and functional components of the O-RU according to the O-RU's configuration capability information (e.g. the O-RU's internal architecture).

According to an example embodiment, an apparatus includes a higher-layer network function of an open radio access network (O-RAN). The higher-layer network function is configured to monitor at least one network parameter for implementing a dynamical antenna array reconfiguration via an O1 interface. Furthermore, the higher-layer network function requests a distributed unit (O-DU) to reconfigure the antenna array based on the monitored at least one network parameter satisfying a predetermined condition.

According to an example embodiment, an apparatus includes a distributed unit (O-DU). The O-DU is configured to receive configuration capability information from a radio unit (O-RU) via management plane (M-Plane) messaging. Moreover, the O-DU receives a request to reconfigure an antenna array from a higher-layer network function and determines an antenna array configuration supported by the O-RU based on the configuration capability information from the O-RU and based on the request to reconfigure the antenna array from the higher-layer network function. Furthermore, based on the determining, the O-DU applies the supported antenna array configuration via control plane (C-Plane) messaging.

According to an example embodiment, an apparatus includes a radio unit (O-RU). The O-RU is configured to send configuration capability information to a distributed unit (O-DU) via management plane (M-Plane) messaging. Moreover, the O-RU receives from the O-DU, an antenna array configuration supported by the O-RU via control plane (C-Plane) messaging, wherein the supported antenna array configuration is based on the configuration capability information of the O-RU and a request to reconfigure an antenna array from a higher-layer network function; and based on the supported antenna array configuration for the O-RU, reconfigure the antenna array antenna model.

According to an embodiment, a method includes monitoring for implementing a dynamical antenna array reconfiguration of at least one network parameter via an O1 interface by a higher-layer network function of an open radio access network (O-RAN). Furthermore, the method includes requesting a distributed unit (O-DU) to reconfigure an antenna array based on the monitored at least one network parameter satisfying a predetermined condition by the higher-layer network function.

According to an embodiment, a method includes receiving, by a distributed unit (O-DU), configuration capability information from a radio unit (O-RU) via management plane (M-Plane) messaging. Moreover, the method includes receiving, by the O-DU, a request to reconfigure an antenna array from a higher-layer network function. Furthermore, the method includes, determining, by the O-DU, an antenna array configuration supported by the O-RU based on the configuration capability information from the O-RU and based on the request to reconfigure the antenna array from the higher-layer network function. In addition, the method includes activating, by the O-DU, the supported antenna array configuration via control plane (C-Plane) messaging.

According to an embodiment, a method includes sending, configuration capability information via management plane (M-Plane) messaging by a radio unit (O-RU) to a distributed unit (O-DU). Furthermore, the method includes receiving, by the O-RU from the O-DU, an antenna array configuration supported by the O-RU via control plane (C-Plane) messaging. The supported antenna array configuration is based on the configuration capability information of the O-RU and a request to reconfigure the antenna array from the higher-layer network function. Moreover, the method includes reconfiguring, by the O-RU, the antenna array configuration of the O-RU based on the supported antenna array configuration for the O-RU.

According to an embodiment, a non-transitory computer-readable recording medium has recorded thereon instructions executable by at least one processor to perform a method. a method includes monitoring for implementing a dynamical antenna array reconfiguration of at least one network parameter via an O1 interface by a higher-layer network function of a radio access network (O-RAN). Furthermore, the method includes requesting a distributed unit (O-DU) to reconfigure an antenna array based on the monitored at least one network parameter satisfying a predetermined condition by the higher-layer network function.

According to an embodiment, a non-transitory computer-readable recording medium has recorded thereon instructions executable by at least one processor to perform a method. The method includes sending, configuration capability information via management plane (M-Plane) messaging by a radio unit (O-RU) to a distributed unit (O-DU). Furthermore, the method includes receiving, by the O-RU from the O-DU, an antenna array configuration supported by the O-RU via control plane (C-Plane) messaging. The supported antenna array configuration is based on the configuration capability information of the O-RU and a request to reconfigure the antenna array from the higher-layer network function. Moreover, the method includes reconfiguring, by the O-RU, the antenna array configuration of the O-RU based on the supported antenna array configuration for the O-RU.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein.

DETAILED DESCRIPTION

The following detailed description of exemplary embodiments refers to the accompanying drawings. The foregoing disclosure provides illustration and description but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that apparatuses, systems and/or methods described herein, may be implemented in different forms of hardware, firmware, or a combination of hardware and software. The actual specialized control hardware or software code used to implement these apparatuses, systems and/or methods is not limited to the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Figure 1:
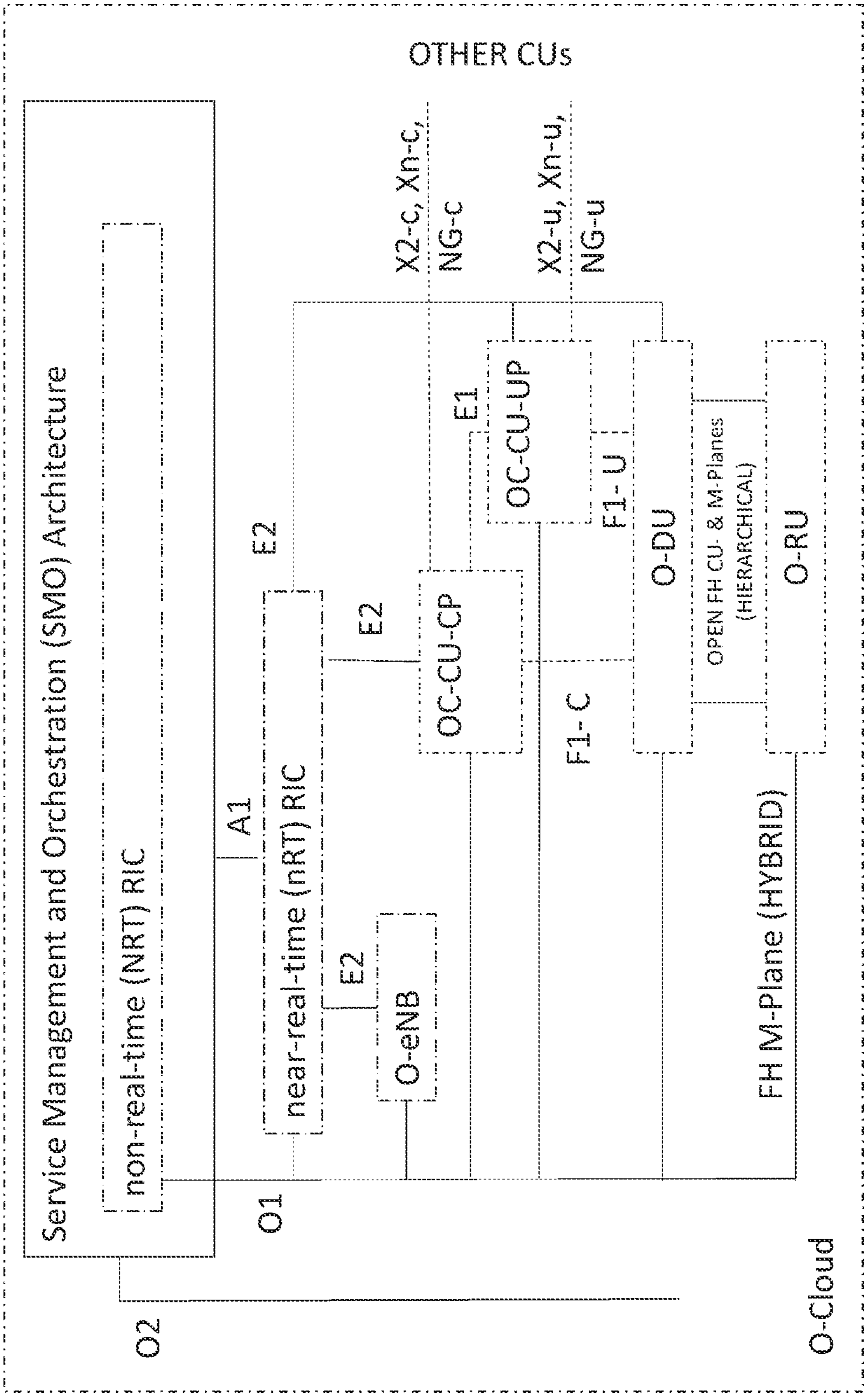
FIG. 1 illustrates an O-RAN architecture in the related art.
Figure 1:
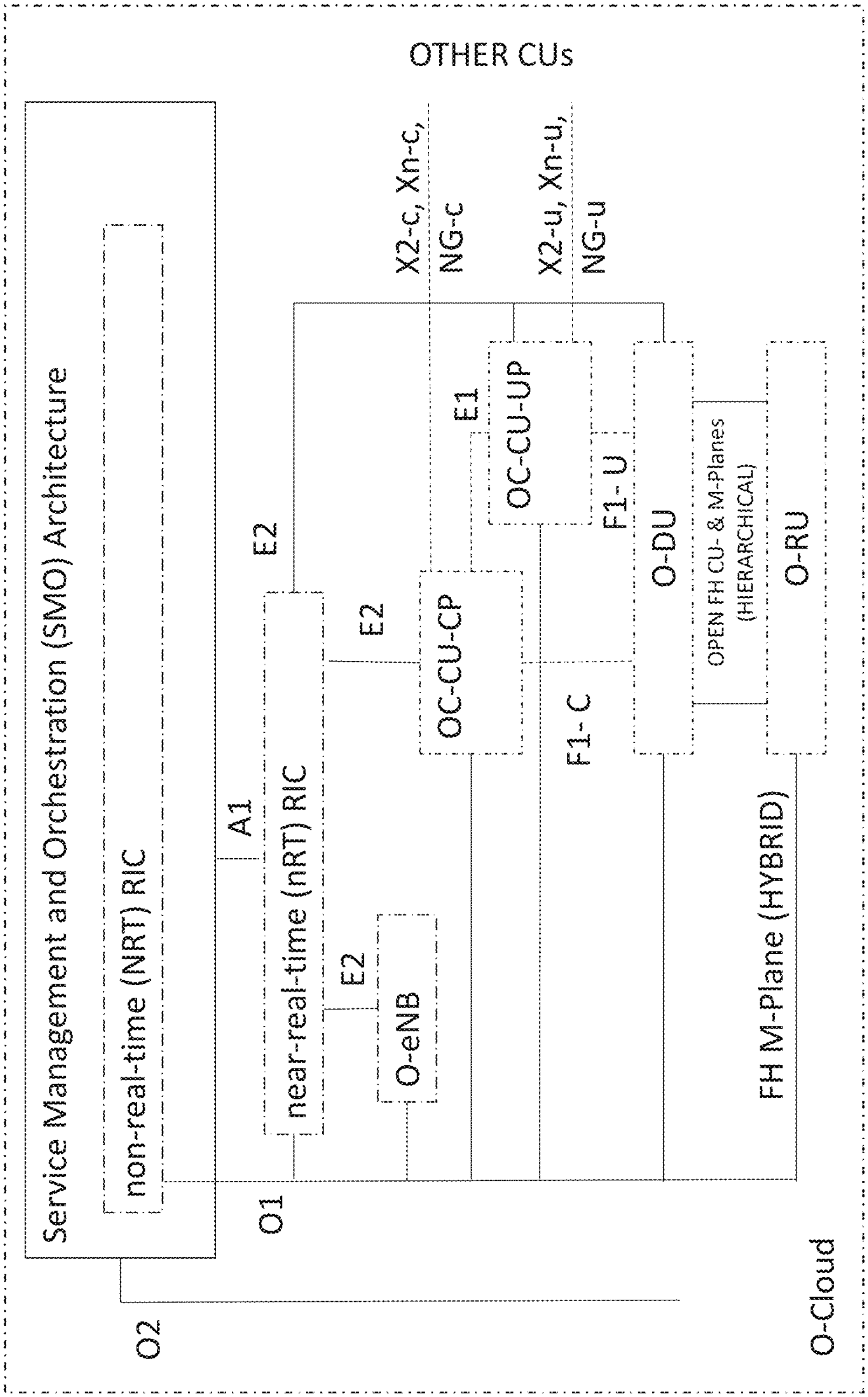
FIG. 1 (PRIOR ART)

In the O-RAN, key performance indicators (KPIs) may relate to network traffic capacity and are monitored by the RIC (i.e., NRT-RIC and/or nRT-RIC) and/or a Cognitive Self Organizing Network (CSON) in coordination with O-CU, O-DU, O-Cloud according to FIG. 1.

For example, the key performance indicators (KPIs) may refer to scheduled data, number of users in a cell, network traffic scenario vs time, user throughput, etc. The key performance indicators (KPIs) allow higher-layer network functions (i.e., SMO, RiC, etc.) of the O-RAN to determine network parameters.

Based on said network parameter, the higher network layers network functions may trigger a request to implement energy saving (ES) methods in the O-RAN. The ES methods may include antenna array configurations. In general, antenna array configurations include Transceiver TRx control methods, radio frequency (RF) channel reconfiguration methods, such as, for example, O-RU TRx control/antenna array selection, data layer control/change the number of spatial streams, etc., that change the number of SSB beams or O-RU antenna transmit power to achieve energy savings. In the related art, a dynamical antenna array reconfiguration, e.g., a dynamic changing of antenna array configurations such as, for example, switching between one antenna array model to another antenna array model (i.e., muting (e.g., turning off) parts of an antenna array (i.e., antenna elements) along with their respective RF transceiver chains) is not implemented.

As a result, without dynamical antenna array reconfiguration ES methods are inefficient due to the proprietary internal architectures of the O-RUs (i.e., read-only (proprietary) parameters).

Furthermore, ES methods according to the related art are unable to dynamically coordinate ES modes by, for example, an O-DU L2 scheduler (i.e., indirectly coordinate ES measures by the nRT-RIC via an E2 interface and/or by the nRT-RIC via the O1 interface) based on the monitored network traffic capacity KPIs (i.e., based on the network parameters).

Thus, according to the shortcomings of the related art, as set forth above, maximum energy savings cannot be achieved by implementing dynamical antenna array reconfiguration within an O-RAN.

Figure 2A:
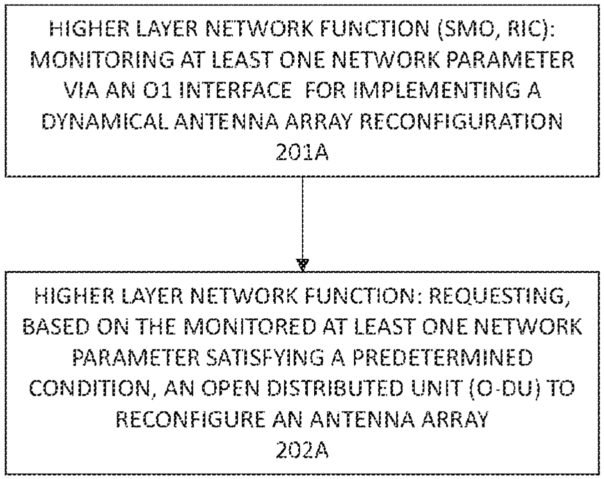
FIG. 2A illustrates a method for implementing a dynamical antenna array reconfiguration from the perspective of a higher-layer function within an O-RAN according to an embodiment.

FIG. 2A illustrates a method for implementing a dynamical antenna array reconfiguration from perspective of a higher-layer function within an O-RAN according to an embodiment. Referring to FIG. 2A, in step 201A, a higher-layer network function (e.g., an O-RAN function such as a SMO, a NRT-RIC, a nRT-RIC, etc.) monitors at least one network parameter via an O1 interface for implementing a dynamical antenna array reconfiguration. For example, the higher-layer network function monitors at least one of an O-RU Priority Based Routing PBR/packet scheduling data via the O1 interface, an O-DU packet scheduling data via the O1 interface and an O-CU packet scheduling data via the O1 interface.

In step 202A, the higher-layer network function requests a distributed unit (O-DU) to reconfigure an antenna array function based on the monitored at least one network parameter satisfying a predetermined condition. For example, the higher-layer network function may determine, based on at least one first predetermined network parameter, to request an antenna array reconfiguration via the O1 interface to the lower layer network function (e.g., the O-DU).

For example, a higher-layer network function (e.g., an O-RAN function such as an SMO, an NRT-RIC, an nRT-RIC, etc.) triggers an energy saving (ES) mode (i.e., a request for antenna array reconfiguration) via O1 interface, based on at least one first predetermined network parameter.

In an example embodiment, the triggering of the energy saving (ES) mode (i.e., the request for antenna array reconfiguration) is based on a comparison of at least one first predetermined network parameter and current network parameters obtained from the monitoring step 201A via the O1 interface.

The Comparison May be an Evaluation of O1-Related Key Performance Indicators (KPIs) of the O-RAN Obtained from Monitoring the O1 Packet Scheduling Data as Set Forth Above.

The higher-layer network function may determine whether the current network parameter (e.g., a current network parameter reflected by the O1-related KPIs such as, for example, throughput, number of users in a cell, user statistics, etc.) is a predetermined first network parameter (e.g., a (first, second, etc.). The predetermined network parameter may be based on Rank Indicator (RI) value shared by a UE, traffic scenarios, etc. that can be derived by said O1 interface related KPIs such as, for example, throughput, number of users in a cell, user statistics, etc.).

Figure 2B:
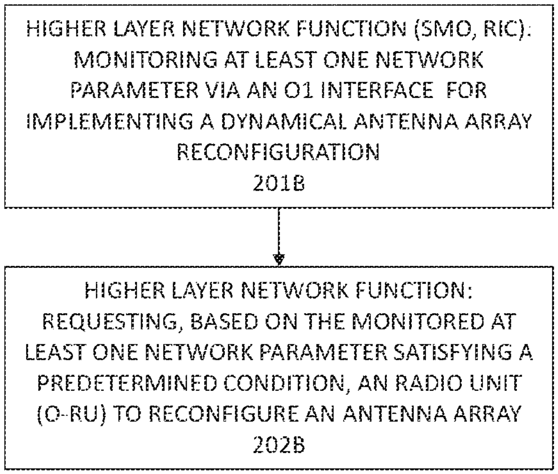
FIG. 2B illustrates a method for implementing a dynamical antenna array reconfiguration from the perspective of a higher-layer function within an O-RAN according to another embodiment.

FIG. 2B illustrates a method for implementing a dynamical antenna array reconfiguration from perspective of a higher-layer function within an O-RAN according to another embodiment. Referring to FIG. 2B, in step 201B, a higher-layer network function (e.g., an O-RAN function such as a SMO, a NRT-RIC, a nRT-RIC, etc.) monitors at least one network parameter via an O1 interface for implementing a dynamical antenna array reconfiguration. For example, the higher-layer network function monitors at least one of an O-RU Priority Based Routing PBR/packet scheduling data via the O1 interface, an O-DU packet scheduling data via the O1 interface and an O-CU packet scheduling data via the O1 interface.

In step 202B, the higher-layer network function requests a radio unit (O-RU) to reconfigure an antenna array function based on the monitored at least one network parameter satisfying a predetermined condition. For example, the higher-layer network function may determine, based on at least one first predetermined network parameter, to request an antenna array reconfiguration via the O1 interface (e.g., via a management plane Fronthaul (FH M-Plane) to the radio function O-RU.

In an example embodiment, a higher-layer network function (e.g., an O-RAN function such as an SMO, an NRT-RIC, an nRT-RIC, etc.) triggers an energy saving (ES) mode (i.e., a request for antenna array reconfiguration) via O1 interface, based on at least one first predetermined network parameter.

Referring to FIG. 2B, the higher-layer network function (e.g., the SMO, RIC) may request the O-RU directly (without messaging via the O-DU) for RF channel reconfiguration/Antenna array selection (NES) via an O1 interface (e.g., via the FH M-Plane) according to the O-RAN hybrid architecture as depicted in FIG. 1. In this case the O-RU may notify the O-DU about the changed configuration to enable the O-DU to schedule data, accordingly (i.e., the O-RU may directly apply the request for antenna array reconfiguration from the higher-layer network function (e.g., the RIC).

In example embodiment, the O-RU may reconfigure the array configuration based on the request to reconfigure an antenna array from the higher-layer network layer. The request is based on the monitored at least one network parameter satisfying a predetermined condition.

To this end, in an example embodiment, O-RU may message to the TRx antenna array (TRx array) for reconfiguration and notify the O-DU after implementation of the change of reconfiguration). In an example embodiment, the O-RU may also acknowledge the request for antenna array reconfiguration (i.e., triggering the ES mode in case the O-RAN is underutilized) to the O-DU.

Figure 3:
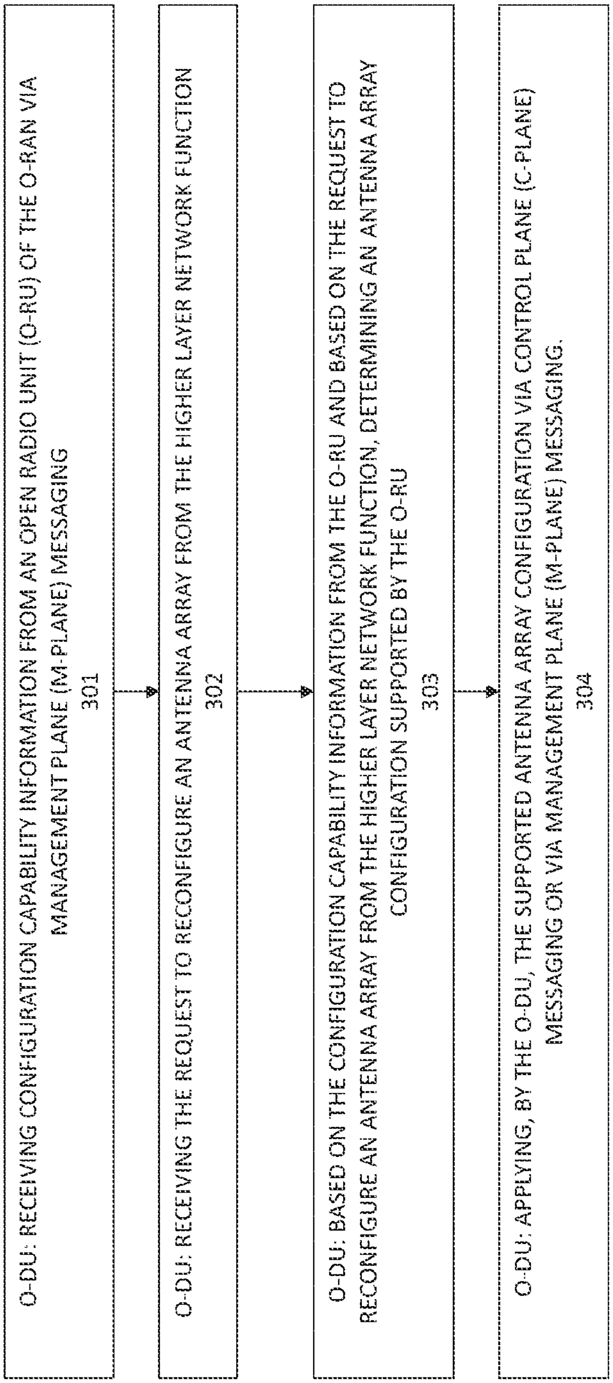
FIG. 3 illustrates a method for implementing a dynamical antenna array reconfiguration from the perspective of an O-DU according to an embodiment.

FIG. 3 illustrates a method for implementing a dynamical antenna array reconfiguration from perspective of an O-DU according to an embodiment.

Referring to FIG. 3, in step 301, the O-DU receives configuration capability information from a radio unit (O-RU) of the O-RAN via management plane (M-Plane) messaging. For example, the O-RU reports configuration capability information such as for example supported energy saving modes by O-RU—urn:o-ran:module-cap:1.0.

For example, the antenna configuration capability information may be hardcoded by the vendor during production along with at least one of the following parameters, a unique name, index, reference, etc. to identify the antenna array configuration capability (e.g., the technical specification of the antenna array), the number of spatial streams/layers supported against each configuration of the antenna array, the antenna calibration data to be applied by O-RU during the configuration change, a value referring to the achievable energy savings against each configuration, associated beam weights (pre-defined beam weights), etc. In an example embodiment, when O-RU is powered on (is initialized), the O-RU starts reporting supported energy saving modes (i.e., antenna array configuration capability information) and the hardcoded antenna array models along with the other initialization parameters to the O-DU using M-Plane yang models (e.g., an urn:o-ran:module-cap:1.0 and an urn:o-ran:hardware:1.0).

In an example embodiment, energy-saving-by-transmission-blanks parameter may be used for sending configuration capability information from the O-RU to O-DU. This allows to the use existing M-Plane models, to provide (i.e., define) new parameters to enable the O-RU to report new energy saving parameters (e.g., energy-saving-by-rf-channel-reconfiguration, energy-saving-by-advanced-sleep-modes, energy-saving-by-modify-no-of-spatial-streams, etc.).

An example for energy-saving-by-transmission-blanks parameter in a M-Plane model may be as follows:

```
grouping energy-saving-method {
  status active;
  description
    "Grouping for energy saving method.
      Note: This grouping is meant for energy saving methods.";
  leaf energy-saving-method {
    type enumeration {
      enum RF-CHANNEL-RECONFIGURATION {
        description
          "RF Channel Reconfiguration will be used";
      }
      enum ADVANCED-SLEEP-MODE {
```

-continued

```
            description
               "Advanced Sleep Mode will be used";
         }
         enum MODIFY NO OF SPATIAL STREAMS {
            description
               "No of Spatial Streams will be modified";
         }
      }
      description
         "Energy saving method which can be supported by the O-RU.
      An O-RU may further refine the applicability of energy saving
      methods per endpoint using o-ran-uplane-conf.yang model";
   }
}
   leaf energy-saving-by-RF-channel-reconfiguration {
      type boolean;
      mandatory true;
      description
         "Parameter informs if unit supports energy saving by RF channel reconfiguration";
   }
         leaf energy-saving-by-Advanced-Sleep-Mode {
      type boolean;
      mandatory true;
      description
         "Parameter informs if unit supports energy saving by Advanced sleep mode";
   }
         leaf energy-saving-by-modify-no-of-spatial-streams {
      type boolean;
      mandatory true;
      description
         "Parameter informs if unit supports energy saving by Modifying no of spatial streams/layers";
   }
```

Regarding existing M-Plane yang models, to ensure the backward compatibility, the O-RU may flag the above-mentioned energy saving mode to false, if O-RU does not support custom configurations or RF channel reconfigurations/antenna array selection approach for ES.

In another example embodiment, O-RU configuration capability information may comprise supported features such as, for example, supported energy saving features in o-ran-wg4-features.yang. The O-RU may indicate the supported energy saving features in the o-ran-wg4-features.yang to O-RU controller (i.e., the O-DU or the higher-layer network functions (e.g., the SMO)).

According to an embodiment, in line with the O-RAN Open Fronthaul M-Plane Specification, which defines the Management Plane of the Open Fronthaul Interface as well as associated YANG models, the O-RU may indicate the supported energy-saving features in associated YANG models a Yang Features such as, for example, o-ran-wg4-features.yang, to an O-RU controller such as the O-DU and/or higher order network function (i.e., the SMO, etc.).

To this end, the O-RU configuration capability information may comprise O-RU-supported feature capabilities using YANG Feature Name Tags such as, for example, TRX-CONTROL, TRX-ON-OFF, ADVANCED-SLEEP-MODE, SLEEP-MODE, LIGHT-HIBERNATE-SLEEP, DEEP-HIBERNATE-SLEEP (i.e., DEEP SLEEP), etc.

The YANG Feature Name Tags TRX-CONTROL or TRX-ON-OFF may describe the turning on/off RF channels or Tx/Rx array elements (i.e., of RF channels or Tx/Rx array elements switch on or off), whereas an M-Plane activation as optional feature control may be not available.

The YANG Feature Name Tags ADVANCED-SLEEP-MODE or SLEEP-MODE may describe turning off (i.e., turning to sleep) carriers and associated O-RU circuit(s) and/or O-RU component(s) (i.e., muting and/switching on/off physical and functional components of the O-RU) based on the respective activated sleep mode, whereas an M-Plane activation as optional feature control may be not available.

The YANG Feature Name Tag HIBERNATE-SLEEP may describe an O-RU Energy saving by turning on/off all [tr]x-carriers and associated O-RU circuits/components for a longer duration, wherein the longer duration in comparison to other sleep modes allows an optional feature control to be implemented hardware/component/energy-saving-enabled as an M-Plane based sleep mode.

The YANG Feature Name Tag LIGHT-HIBERNATE-SLEEP may describe O-RU Energy saving by turning on/off carriers and associated O-RU circuits/components for a longer duration without turning off synchronization, wherein the longer duration in comparison to other sleep modes allows an optional feature control to be implemented hardware/component/energy-saving-enabled as a M-Plane based sleep mode.

The YANG Feature Name Tag DEEP-HIBERNATE-SLEEP (i.e., Deep sleep) may describe O-RU Energy saving by turning on/off carriers and associated O-RU circuits/components for a longer duration by off synchronization, wherein the longer duration in comparison to other sleep modes allows an optional feature control to be implemented hardware/component/energy-saving-enabled as a M-Plane based sleep mode.

According to an example embodiment, referring to the YANG Feature Name Tags ADVANCED-SLEEP-MODE or SLEEP-MODE may define various short duration (C Plane based) sleep modes, for example, the advanced sleep mode may be for shorter sleep duration like milliseconds, seconds, or minutes and activated, for example, with ST4 C Plane message by Control Plane (C-Plane) messaging.

According to an example embodiment, referring to the YANG Feature Name Tag HIBERNATE-SLEEP for longer duration a hibernate-sleep mode may be activated by employing M Plane, for example, by setting the parameter+--rw energy-saving-enabled? boolean {ENERGYSAVING}? in the respective o-ran-hardware.yang module to “True” or “Yes”.

According to an example embodiment, referring to the YANG Feature Name Tags LIGHT-HIBERNATE-SLEEP and DEEP-HIBERNATE-SLEEP in order to differentiate the longer sleep with and without turning off synchronization plane circuit, light-hibernate-sleep mode with synchronization and deep-hibernate-sleep mode without synchronization may be implemented in a same way as that of hibernate-sleep by employing the M Plane, for example, by setting the parameter+--rw energy-saving-enabled? boolean {ENERGYSAVING}? in the respective o-ran-hardware.yang module to “True” or “Yes”.

Referring to the O-RU reporting to the O-DU (i.e. the receiving of O-RU configuration capability information by the O-DU) based on yang modules such as, for example, as specified in the o-ran module.cap.yang, Advanced Sleep Modes (ASM) may support sleep modes (SM) having a short duration (C-Plane based) sleep modes (e.g., a plurality of Sleep modes such as, for example, SM #0, SM #1, SM #2, SM #3, etc, wherein the time duration of SM #0<SM #1<SM #2<SM #3) with different wake-up times or if the wake-up times is too short a defined go-to-sleep time. Moreover, the Advanced Sleep Modes (ASM) may support sleep modes having a long duration (M-Plane based) sleep modes (e.g., the hibernate sleep that does not involve any synchronization (i.e., S-Plane is turned off) or the hibernate sleep modes with or without synchronization (i.e., S-Plane is turned on/off or is turned to sleep), whereas the light hibernate sleep refers to a M-Plane based sleep mode with synchronization (i.e., S-Plane remains active) and the deep hibernate sleep refers to a M Plane based sleep mode without synchronization (i.e., S-Plane is turned off).

According to an embodiment, the Advanced Sleep Modes (ASM) have a wake-up time (minimum or guaranteed) per sleep mode. The shortest of the C-Plane-based sleep modes (e.g., SM #0) may be not defined by a minimum or guaranteed wake-up time but by go-to-sleep time.

The O-RU reporting to the O-DU and/or SMO based on yang modules such as, for example, as specified in the o-ran module.capc.yang, may also support of C-Plane messages such as Section Type 8 (ST8) “ready” message and C-Plane messages including a command scope (e.g., CARRIER-COMMAND, ARRAY-COMMAND, O-RU-COMMAND) such as, for example, a Section Type 4 (ST4) message.

According to an example embodiment, the TRx control methods to reconfigure the antenna array may include TRx control configurations that are identified by a respective unique configuration identity or name. The antenna array model of said TRx control configurations includes at least one antenna mask (antMask), wherein the antenna mask bits combination may be limited only to the supported TRx control configurations, wherein the antenna mask bits identify a ‘0’ for antenna elements to be turned off and ‘1’ for active elements of the antenna array. Moreover, TRx control configurations include in addition to the mask bits for at least one antenna mask (antMask), antenna layer mask bits for creating at least one antenna layer mask (antLayerMask).

To this end, the O-RU may report its capabilities via a Yang model o-ran-module-cap.yang for TRx control and data layer control. The Yang model o-ran-module-cap.yang may include the parameter following the summary.

```
o-ran-module-cap.yang – TRx control and data layer control
module: o-ran-module-cap
+--rw module-capability
    +--ro ru-capabilities
//TRx control – Capability reporting
  | +--ro trx-control-capability {or-feat:TRX-CONTROL}?
  |  |        +--ro number-of-supported-trx-control-configuration?   Uint8   //number of
supported TRx control configuration.
    |  |        +--ro supported-trx-control-configuration* [name]
  |  |  |        +--ro configuration-name   string   //unique name of each TRx control
configuration
  |  |        |    +--ro antenna-mask?
    binary or bits //antMask list – antenna mask per TRx control config for all
  |  |        |    +--ro antenna-layer-mask?
    binary or bits //antLayerMask list – antenna layer mask per TRx control config for all
  |  |        |    +--ro transition-time or wake-up-time      uint32
    //transition time (list) associated with each configuration change for the supported TRx
control configurations and as a function of sub carrier spacing. Since for 15 KHz, 1 slot is 1 milli
second, and for 30 KHz, 1 slot is 0.5 milli second or 500 micro-seconds
  |  |        |    +--ro energy-saving-ratio
    uint8          //percentage of energy saving per TRx control configuration
//data-layer/spatial streams control – Capability reporting
  |  +--ro data-layer-control-supported?   boolean   {or-feat:TRX-CONTROL}?   //Data layer
control/limiting no of spatial streams supported by O-RU or not?
```

According to an example embodiment, the supported TRx control configurations may comprise a transition time (i.e., different from a wake-up time of the ASMs) that defines a minimum or guaranteed time required to switch from baseline configuration to specific configuration (i.e., switch a baseline 64TRx antenna array to another antenna mask configuration such as, for example, a 32TRx_antenna array model). The transition time (i.e., wake-up time) associated with each configuration change for the supported TRx control configurations and as a function of sub-carrier spacing may be, for example, for 15 KHz, one slot is 1 millisecond, for 30 KHz, one slot is 0.5 millisecond or 500 microseconds, etc.

According to an example embodiment, the O-RU may report data layer control capability or the capability of limiting of number of spatial streams by a Yang model o-ran-module-cap.yang as set forth above for at least one supported (i.e., given) antenna configuration.

In an example embodiment, the TRx of an antenna array (e.g., a 64T64R antenna array) may be kept active, whereas the gain (i.e., energy saving gain) may be realized from the turning off O-RU processing equipment by changing number of data layers/spatial streams. According to an example embodiment, the TRx control methods may include control to turn on/off entire RF Transceiver chains and/or Radio Frequency Front End (RFFE) of Radio Frequency (RF) processing unit pertaining to some of the RF channels/antenna elements.

Moreover, according to another example embodiment, the TRx control methods may include control to turn on/off Components, Circuits, Computing engines of the digital baseband and O-RAN Fronthaul processing units (i.e., physical components of the O-RU).

According to embodiments of the Advanced Sleep Modes (ASM) having short duration (C-Plane based) sleep modes and sleep modes having long duration (M Plane based) sleep modes the wake-up latency (i.e., the wake-up time or the go-to-sleep time) for said ASM and the wake-up latency of the TRx control may be different and not interfere with (e.g., hinder) each other.

The O-RU reporting to the O-DU and/or SMO based on yang modules such as, for example, as specified in the o-ran module.cap.yang, may also support sleep duration extension and emergency wake-up by M Plane or C Plane messaging for normal (i.e., scheduled or predetermined) wake-up.

Moreover, the O-RU reporting to the O-DU and/or SMO based on yang modules such as, for example, as specified in the o-ran module.cap.yang may also provide information such as the percentage of achievable energy savings Furthermore, the O-RU reporting to the O-DU and/or SMO based on yang modules such as, for example, as specified in the o-ran module.cap.yang, may also support a notification messaging for CU plane active or inactive state, such as, for example, support a notification that may be required to ensure the CU plane become active after sleep duration expires (i.e., a CU plane circuit may be turned off in the case of defined, undefined, and/or longer sleep duration). To this end, the O-RU reporting to the O-DU and/or SMO supports notifications from O-RU to O-DU about CU plane status in case it is turned off during any of the sleep mode activations.

In general, the o-ran-module-cap.yang relates to common O-RU capabilities (i.e., O-RU configuration capability information for sleep modes (e.g., advanced sleep modes), CU-Plane status reporting to implement the sleep modes (e.g., advanced sleep modes) and TRx control methods.

To this end, the o-ran-module-cap.yang among other YANG models may comprise all necessary information to implement an antenna array configuration support by the O-RU (i.e., based on said O-RU configuration capability information).

According to an example embodiment, the o-ran-module-cap.yang among other YANG models for TRx control methods to reconfigure the antenna array may include TRx control configurations that are identified by a respective unique configuration identity or name. The antenna array model of said TRx control configurations includes at least one antenna mask (antMask), wherein the antenna mask bits combination may be limited only to the supported TRx control configurations, wherein the antenna mask bits identify a '0' for antenna elements to be turned off and '1' for active elements of the antenna array. Moreover, TRx control configurations include in addition to the mask bits for at least one antenna mask (antMask), antenna layer mask bits for creating at least one antenna layer mask (antLayerMask).

The Yang model o-ran-module-cap.yang may include the parameters according to the following summary.

```
o-ran-module-cap.yang – Advanced sleep mode
module: o-ran-module-cap
+--rw module-capability
        +--ro ru-capabilities
   | +--ro max-num-component-carriers? uint8
   | x--ro max-num-bands? uint16
//Advanced sleep mode – Capability reporting
   |   +--ro advanced-sleep-mode-capability? enumeration {or-feat:ADVANCED-SLEEP-MODE}?
   |   |   +--ro supported-sleep-modes* [name]                        //list of
supported sleep modes like sleep mode 0, 1, 2, and 3 (SM#0-3)
   |   |        |            +--ro sleep-mode-name
        string //sleepMode0 (SM#1), sleepMode1 (SM#2), sleepMode2 (SM#2), and sleepMode3
(SM#3)
   |   |        |            +--ro wake-up-time
        uint32   //wake-up time list (minimum or guaranteed) associated with each sleep
mode and represented in slots as a function of Sub carrier spacing. For e.g., SM#1 – L slots, SM# 2 –
M slots, and SM#3 – N slots. The wake-up time in slots are listed for all supported sub carrier
spacing by O-RU. Since for 15 KHz, 1 slot is 1 milli second, and for 30 KHz, 1 slot is 0.5 milli
second or 500 micro-seconds.
   |   |        |            +--ro energy-saving-ratio
        uint8              //percentage of energy saving per sleep mode
   | +--ro hibernate-sleep-capability {or-feat:HIBERNATE-SLEEP}?          //option# 1:
longer sleep duration
   |   |   +--ro hibernate-wake-up-time or wake-up-time-hibernate   uint32   //wake-up time in
milli seconds for hibernate sleep
   |   +--ro light-hibernate-sleep-capability {or-feat:LIGHT-HIBERNATE-SLEEP}? // option#2a:
longer sleep duration with synchronization
   |   |   +--ro lh-wake-up-time or wake-up-time-lh                uint32
//wake-up time in milli seconds for light hibernate sleep
   |   +--ro deep-hibernate-sleep-capability {or-feat:DEEP-HIBERNATE-SLEEP}? // option#2b:
longer sleep duration without synchronization
   |   |   +--ro dh-wake-up-time or wake-up-time-dh                uint32
//wake-up time in milli seconds for deep hibernate sleep
   |   |   +--ro supported-command-scope*   enumeration   //supported ST4 command scope such
as "CARRIER-COMMAND, ARRAY-COMMAND, O-RU-COMMAND" to be reported by O-RU.
For e.g., one or two or all three
   |   |   +--ro st8-ready-msg-supported?   boolean   //O-RU already reports the support of
Section Type (ST) 8 message in supported-section-types, hence in NES perspective support of
"ready" command in ST8 message to reported by O-RU as a capability
   |   |   +--ro sleep-duration-extension-supported?   boolean   //in defined sleep, if O-DU wants
```

-continued to extend the ongoing sleep it can issue sleep extension C Plane command (short sleep duration) and M Plane command (long sleep duration). The supported of this could be advertised by O-RU as an optional.
| | +--ro emergency-wake-up-by-cplane-command-supported? boolean //(in defined (not guaranteed) or undefined sleep duration, O-DU could any time interrupt the sleep by issuing emergency wake-up C Plane command, provided CU plane remain active or CU plane circuit ON. This support could be advertised by O-RU as an optional.
| | +--ro emergency-wake-up-by-mplane-command-supported? boolean //(in defined (not guaranteed) or undefined sleep duration, O-DU could any time interrupt the sleep by issuing emergency wake-up command via M Plane as CU plane is turned off. This support could be advertised by O-RU as an optional.

Referring to the above summary of the Yang model o-ran-module-cap.yang common O-RU capabilities for both TRx control and Advanced sleep mode.

According to an example embodiment, the supported TRx control configurations may comprise a transition time (i.e., different from a wake-up time of the ASMs) that defines a minimum or guaranteed time required to switch from baseline configuration to specific configuration (i.e., switch a baseline 64TRx antenna array to another antenna mask configuration such as, for example, a 32TRx_antenna array model). The transition time (i.e., wake-up time) associated with each configuration change for the supported TRx control configurations and as a function of sub-carrier spacing may be, for example, for 15 KHz, one slot is 1 millisecond, for 30 KHz, one slot is 0.5 millisecond or 500 microseconds, etc.

According to an example embodiment, the TRx control methods may include control to turn on/off entire RF Transceiver chains and/or Radio Frequency Front End (RFFE) of Radio Frequency (RF) processing unit pertaining to some of the RF channels/antenna elements.

Moreover, according to another example embodiment, the TRx control methods may include control to turn on/off Components, Circuits, IPs, Computing engines of the digital baseband and O-RAN Fronthaul processing units (i.e., physical components of the O-RU).

According to embodiments of the Advanced Sleep Modes (ASM) having short duration (C-Plane based) sleep modes and sleep modes having long duration (M Plane based) sleep modes the wake-up latency (i.e., the wake-up time or the go-to-sleep time) for said ASM and the wake-up latency of the TRx control methods may be different and not interfere with (e.g., hinder) each other.

Moreover, regarding common capability parameters to be reported by O-RU configuration capability information to the O-DU via M Plane for both TRx control methods and sleep modes (e.g., advanced sleep modes) may include C-Plane ST8 “ready” messages and sleep duration extension (e.g., in case of defined sleep, if the O-DU needs to extend a sleep mode it send a sleep extension command just before the start of wake-up time). In case the CU-Plane remains active, the extension command may be C-Plane based for short sleep durations. In case the CU-Plane is turned off the extension command may be M Plane based for long sleep durations.

Furthermore, regarding common capability parameters to be reported by O-RU configuration capability information to the O-DU via M Plane for both TRx control methods and sleep modes (e.g., advanced sleep modes) may include an emergency wake-up of O-RU from sleep. This capability may be reported by O-RU via M Plane. For example, in case of sleep mode interruption, if the O-DU needs to interrupt a sleep mode it sends a sleep mode interruption command (i.e., a C-Plane command). In case the CU-Plane remains active, the emergency wake-up command may be C-Plane based for short sleep durations (defined or undefined). In case the CU-Plane is turned off the emergency wake-up command may be M Plane based for long sleep durations (defined or undefined).

According to an example embodiment, the o-ran-module-cap.yang among other YANG models for CU-Plane status reporting (e.g., to implement O-RU capabilities for defined and undefined sleep modes). The o-ran-module-cap.yang comprises information to enable a CU Plane circuit to be turned off to attain additional energy saving. The information may include a name identifier and a status identifier of the rx-array-carriers as well as a name identifier, action identifier and state for the cu-plane in order to report the user plane configuration. Based on the above information, the O-DU may turn on or wake-up CU-Plane circuit through the M-Plane. According to an example embodiment, a notification is needed to indicate if CU-Plane become active or not (wake-up from sleep), the same may be defined in the o-ran-uplane.yang, respectively.

The Yang model o-ran-uplane.yang may include the parameter according to the following summary.

```
o-ran-uplane-conf.yang
+--ro rx-array-carriers* [name]
+--ro name -> /user-plane-configuration/rx-array-carriers/name
+--ro state? -> /user-plane-configuration/rx-array-carriers/state
+---n cu-plane-state-change
| +--ro cu-plane [name]
| +--ro active? -> /user-plane-configuration/cu-plane/active;
Active/Inactive
| +--ro state? -> /user-plane-configuration/cu-plane/state:
Enabled/Disabled
```

According to an example embodiment for the use case RF Channel Reconfiguration (i.e., RF Channel Switch Off/On) a sub use case may be defined as TRx Control (i.e., a Tx array control and Rx array control may be claimed separately since antenna masks may be defined per array level. For this sub user case, the O-RU may include at least one of the following capability reporting (i.e., configuration capability information). The configuration capability information may include among other capability reporting at least the reporting of support of a C-Plane and a M-Plane based TRx control activation/deactivation, the reporting of a list of supported antenna array configuration/TRx control configurations (e.g., valid Antenna mask values (per antenna array configuration values) along with unique name, the reporting of wake-up time/duration as a function of SCS (Sub-carrier spacing) (i.e., this wake-up may be different from the wake-up time/duration reported for Advanced sleep mode), the reporting of the support of TRx control sleep modes, the reporting of the amount of achievable energy saving/power saving/energy saving ratio per antenna array configuration (Tx array and/or Rx array) or TRx control (Tx control and/or Rx control), the reporting of the support of defined and undefined duration sleep, ST8 ready message, sleep duration extension, and emergency wake-up and the reporting of the O-RU internal architecture (functional blocks) using valid yang data model parameters to attain maximum energy savings (i.e., exposing the O-RU internal architecture).

According to another example embodiment for the use case RF Channel Reconfiguration (i.e., RF Channel Switch Off/On) a sub use case may be include the capability reporting (i.e., configuration capability information) of the O-RU that supports a list of maximum supported spatial streams/data layers per antenna array (TRx Control) configuration. For example, this a sub use case may be defined as Data layer Control.

According to another example embodiment, for example, a sub use case may be defined as Advanced Sleep Mode. This sub use case may be include the capability reporting (i.e., configuration capability information) of the O-RU that supports at least one of the following capability reporting (i.e., configuration capability information). The configuration capability information may include among other capability reporting at least the reporting of a wake-up duration associated with each sleep mode as a function of the SCS, the reporting of the amount of achievable energy saving per sleep mode type, the reporting of the support of defined and undefined duration sleep, ST8 ready message, sleep duration extension, and emergency wake-up.

According to another example embodiment for the use case RF Channel Reconfiguration (i.e., RF Channel Switch Off/On) a sub use case may be defined as Hibernate sleep. For this sub user case, the O-RU may include at least one of the following capability reporting (i.e., configuration capability information). The configuration capability information may include among other capability reporting at least the reporting of support of Hibernate sleep (i.e., Deep-Sleep) such as long duration sleep (light/deep sleep), the reporting of support of removal/deconfiguring the carriers by the O-RU during long sleep, the reporting of support of turning off the C-Plane, U-Plane, S-Plane (i.e. the support of an O-DU request (e.g., by sending appropriate RPC(s)) or by the O-RU's internal logic)), whereas M-Plane processing units should remain active.

In step 302, the O-DU receives the request to reconfigure an antenna array from the higher-layer network function. As set forth in step 202A in FIG. 2A, the request to reconfigure an antenna array is based on the monitored at least one network parameter satisfying a predetermined condition.

In step 303, the O-DU determines an antenna array configuration supported by the O-RU. The determined an antenna array configuration is based on the configuration capability information from the O-RU as set forth in step 203 and based on the request to reconfigure an antenna array from the higher-layer network function as set forth in step 202.

In step 304, the O-DU applies the supported antenna array configuration via control plane (C-Plane) messaging or via management plane (M-Plane) messaging.

According to the example embodiments as set forth in step 301, sleep modes may be a control plane (C-Plane) or management plane (M-Plane) compatible depending on the sleep duration.

According to example embodiments of the Advanced Sleep Modes (ASM) having short duration (C-Plane based) sleep modes and sleep modes having a long duration (M Plane based) sleep modes the wake-up latency (i.e., the wake-up time or the go-to-sleep time) for said ASM and the wake-up latency of the TRx control methods may be different and not interfere with (e.g. hinder) each other.

Referring to FIGS. 2A, 2B and 3, the methods for implementing a dynamical antenna array reconfiguration within an open radio access network (O-RAN) according to steps 201 to 205 provides a notification mechanism between the O-RU and the O-DU without significant changes of existing O-RAN CUS-Plane and M-Plane specifications to execute and indicate a transition from one antenna array configuration to another antenna array configuration while allowing the O-RU to report its O-RU's configuration capability information (e.g., the O-RU internal architecture) to O-DU.

This has the advantage that the O-DU can apply either generated or predefined beam weights to the antenna models in a manner supported by the configuration capability information of the O-RU so that the antenna calibration requirements against each antenna array configuration are met and maximum energy saving can be achieved by muting physical and functional components of the O-RU according to the O-RU's configuration capability information (e.g. the O-RU's internal architecture).

The method for implementing a dynamical antenna array reconfiguration within an open radio access network (O-RAN) according to FIGS. 2A, 2B and 3 may be implemented in at least one apparatus comprising a memory to store instructions and a processor configured to execute instructions.

According to an example embodiment, the apparatus includes a higher-layer network function of an open radio access network (O-RAN). The higher-layer network function is configured to monitor at least one network parameter for implementing a dynamical antenna array reconfiguration via an O1 interface. Furthermore, the higher-layer network function requests a distributed unit (O-DU) to reconfigure an antenna array based on the monitored at least one network parameter satisfying a predetermined condition.

According to an example embodiment, the apparatus includes a distributed unit (O-DU). The O-DU is configured to receive configuration capability information from a radio unit (O-RU) via management plane (M-Plane) messaging. Moreover, the O-DU receives a request to reconfigure an antenna array from a higher-layer network function and determines an antenna array configuration supported by the O-RU based on the configuration capability information from the O-RU and based on the request to reconfigure an antenna array from the higher-layer network function. Furthermore, based on the determining, the O-DU applies the supported antenna array configuration via control plane (C-Plane) messaging.

Figure 4A:
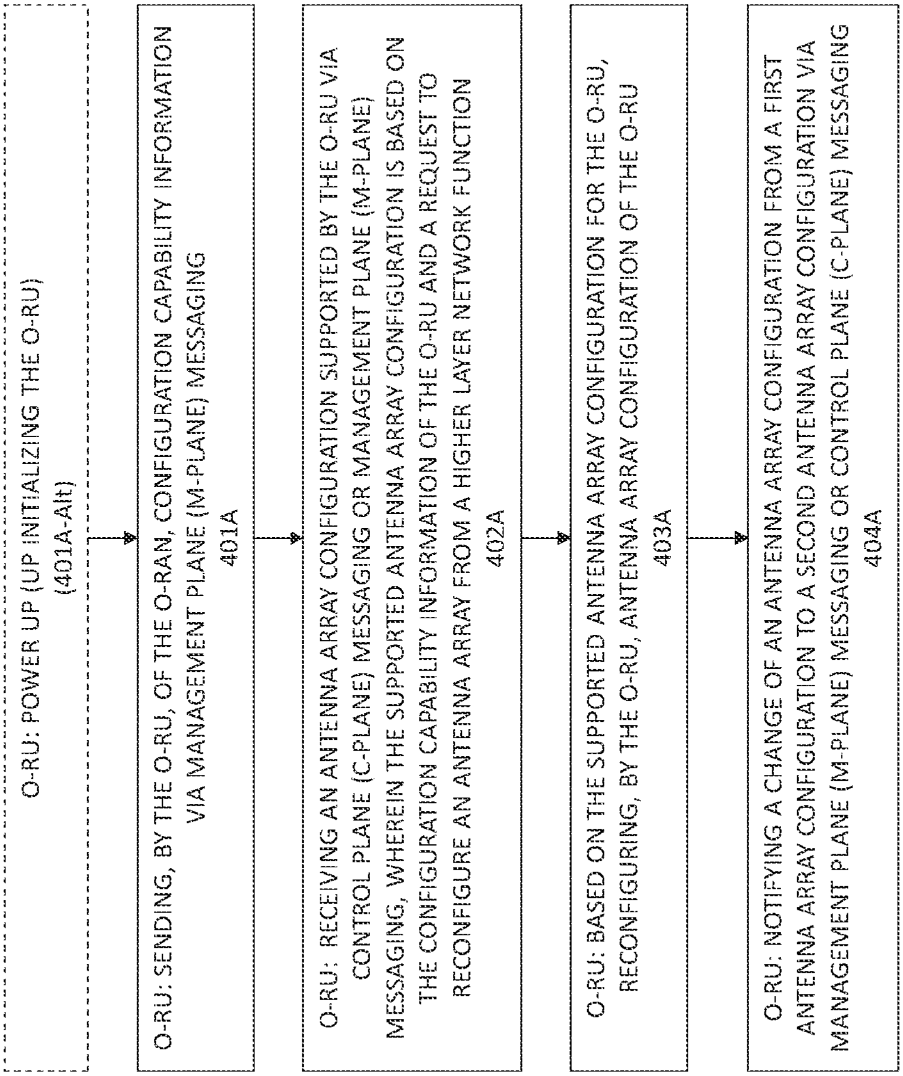
FIG. 4A illustrates a method for implementing a dynamical antenna array reconfiguration in a hierarchical deployment from the perspective of an O-RU according to an embodiment.

FIG. 4A illustrates a method for implementing a dynamical antenna array reconfiguration in a hierarchical deployment from perspective of the O-RU. Referring to FIG. 4A the O-RU communicates (e.g., sends upon initialization and/or during operation) its configuration capability information required to perform an antenna array reconfiguration via the M-Plane to the O-DU, receives (from the O-DU) an antenna array configuration supported by the O-RU via control plane (C-Plane) messaging OR management plane (M-Plane) messaging and reconfigures the antenna array antenna model based on the supported antenna array configuration for the O-RU.

In step 401A-Alt, the O-RU powers up and initializes O-RU functionality after, for example, an installation to the inventory of the O-RAN, maintenance, update, etc.

In step 401A, the O-RU sends its configuration capability information via management plane (M-Plane) messaging. The O-RU configuration capability information explained in step 203 in FIG. 2 refers to step 301 in FIG. 3, respectively.

According to example embodiment, in step 401A, upon powering up, the O-RU communicates (e.g., sends) its configuration capability information required to perform an antenna array reconfiguration via the M-Plane to the O-DU. In an example embodiment, the O-RU, during start-up, exposes (reports) its capability data (including the antenna configuration capability information) to the O-DU via the Fronthaul (FH) interface to support various ES methods (e.g., TRx control methods such as, for example, the RF channel reconfiguration, antenna array selection etc. and sleep modes such as, for example, advance sleep mode, etc.). In another example embodiment, the O-RU communicates (e.g., sends) a plurality of supported antenna models/configurations (i.e., antenna configuration capability information) through the M-Plane to the O-DU.

In another example embodiment, the O-RU, during operation, communicates (e.g., sends) its configuration capability information required to perform an antenna array reconfiguration via the M-Plane to the O-DU. For example, the higher-layer network function may perform a rollback of an ES method from an energy saving network state to an original network state (e.g., it turn on an O-RU or parts of O-RU). In another case the higher-layer network function may perform a rollback of an ES method from an energy saving network state or an original state to an high-performance network state (e.g., it switches on an idling O-RU or parts of idling O-RU to maximum performance).

According to an example embodiment, the antenna configuration capability information (O-RU antenna configuration capability information) may be hardcoded by the vendor during production along with at least one of the following parameters, a unique name, index, reference, etc. to identify the antenna array configuration capability (e.g., the technical specification of the antenna array), the number of spatial streams/layers supported against each configuration of the antenna array, the antenna calibration data to be applied by O-RU during the configuration change, a value referring to the achievable energy savings against each configuration, associated beam weights (pre-defined beam weights), etc. In an example embodiment, when O-RU is powered on (is initialized), the O-RU starts reporting supported energy saving modes (i.e., antenna array configuration capability information) and the hardcoded antenna array models along with the other initialization parameters to the O-DU using M-Plane yang models (e.g., an urn: O-ran:module-cap:1.0 and an urn:o-ran:hardware:1.0).

According to an embodiment, in line with the O-RAN Open Fronthaul M-Plane Specification, which defines the Management Plane of the Open Fronthaul Interface as well as associated YANG models, the O-RU may indicate the supported energy-saving features in associated YANG models a Yang Features such as, for example, o-ran-wg4-features.yang, to a lower order network function other than O-RU and/or higher order network function (i.e., an O-RU controller such as the O-DU and/or the SMO, SMO framework, etc.).

To this end, the O-DU may identify O-RU-supported feature capabilities using YANG Feature Name Tags such as for example, TRX-CONTROL, TRX-ON-OFF, ADVANCED-SLEEP-MODE, SLEEP-MODE, LIGHT-HIBERNATE-SLEEP, DEEP-HIBERNATE-SLEEP (i.e., DEEP-SLEEP), etc.

The YANG Feature Name Tags TRX-CONTROL or TRX-ON-OFF may describe the turning on/off RF channels or Tx/Rx array elements (i.e., of RF channels or Tx/Rx array elements switch on or off), whereas an M-Plane activation as an optional feature control may be not available.

The YANG Feature Name Tags ADVANCED-SLEEP-MODE or SLEEP-MODE may describe turning on/off carriers and associated O-RU circuit(s) and/or O-RU component(s) (i.e., muting and/switching on/off physical and functional components of the O-RU) based on the respective activated sleep mode, whereas an M-Plane activation as optional feature control may be not available.

The YANG Feature Name Tag HIBERNATE-SLEEP may describe an O-RU Energy saving by turning on/off carriers and associated O-RU circuits/components for a longer duration, wherein the longer duration in comparison to other sleep modes allows an optional feature control to be implemented hardware/component/energy-saving-enabled as a M-Plane based sleep mode.

The YANG Feature Name Tag LIGHT-HIBERNATE-SLEEP may describe O-RU Energy saving by turning on/off carriers and associated O-RU circuits/components for a longer duration without turning off synchronization, wherein the longer duration in comparison to other sleep modes allows an optional feature control to be implemented hardware/component/energy-saving-enabled as a M-Plane based sleep mode.

The YANG Feature Name Tag DEEP-HIBERNATE-SLEEP may describe O-RU Energy saving by turning on/off carriers and associated O-RU circuits/components for a longer duration by turning off synchronization, wherein the longer duration in comparison to other sleep modes allows an optional feature control to be implemented hardware/component/energy-saving-enabled as a M-Plane based sleep mode.

According to an example embodiment, referring to the YANG Feature Name Tags ADVANCED-SLEEP-MODE or SLEEP-MODE may define various short duration (C Plane based) sleep modes, for example, the Advanced sleep mode may be for shorter sleep duration like milliseconds, seconds, or minutes and activated, for example, with ST4 C Plane message by Control Plane (C-Plane) messaging.

According to an example embodiment, referring to the YANG Feature Name Tag HIBERNATE-SLEEP for the longer duration a hibernate-sleep mode may be activated by employing M Plane, for example, by setting the parameter+--rw energy-saving-enabled? boolean {ENERGYSAVING}? in the respective o-ran-hardware.yang module to “True” or “Yes”.

According to an example embodiment, referring to the YANG Feature Name Tags LIGHT-HIBERNATE-SLEEP and DEEP-HIBERNATE-SLEEP in order to differentiate the longer sleep with and without turning off synchronization plane circuit, light-hibernate-sleep mode with synchronization and deep-hibernate-sleep mode without synchronization may be implemented in a same way as that of hibernate-sleep by employing the M Plane, for example, by setting the parameter+--rw energy-saving-enabled? boolean {ENERGYSAVING}? in the respective o-ran-hardware.yang module to “True” or “Yes”.

Referring to the O-RU reporting to the O-DU and/or SMO based on yang modules such as, for example, as specified in the o-ran module.cap.yang, Advanced Sleep Modes (ASM) may support sleep modes having a short duration (C-Plane based) sleep modes (e.g., a plurality of sleep modes (SM) such as, for example, SM #0, SM #1, SM #2, SM #3, etc, wherein the time duration of SM #0<SM #1<SM #2<SM #3)

with different wake-up times or if the wake-up times is too short a defined go-to-sleep time. Moreover, the Advanced Sleep Modes (ASM) may support sleep modes having a long duration (M Plane based) sleep modes (e.g., the hibernate sleep that does not involve any synchronization or the hibernate sleep modes with or without synchronization, whereas the light hibernate sleep refers to a M Plane based sleep mode with synchronization and the deep hibernate sleep refers to a M Plane based sleep mode without synchronization.

According to an embodiment, the Advanced Sleep Modes (ASM) have a wake-up time (minimum or guaranteed) per sleep mode. The shortest of the C-Plane-based sleep modes (e.g., SM #0) may be not defined by a minimum or guaranteed wake-up time but by go-to-sleep time.

The O-RU reporting to the O-DU and/or SMO based on yang modules such as, for example, as specified in the o-ran module.cap.yang, may also support of C-Plane messages such as Section Type 8 (ST8) "ready" message and C-Plane messages including a command scope (e.g., CARRIER-COMMAND, ARRAY-COMMAND, O-RU-COMMAND) such as, for example, a Section Type 4 (ST4) message.

The O-RU reporting to the O-DU and/or SMO based on yang modules such as, for example, as specified in the o-ran module.cap.yang, may also support sleep duration extension and emergency wake-up by M Plane and/or C Plane messaging.

Moreover, the O-RU reporting to the O-DU and/or SMO based on yang modules such as, for example, as specified in the o-ran module.cap.yang may also provide information such as the percentage of achievable energy savings.

Furthermore, the O-RU reporting to the O-DU and/or SMO based on yang modules such as, for example, as specified in the o-ran module.cap.yang, may also support a notification messaging for CU plane active or inactive state, such as, for example, support a notification that may be required to ensure the CU plane become active after sleep duration expires (i.e., a CU plane circuit may be turned off in the case of defined, undefined, and/or longer sleep duration). To this end, the O-RU reporting to the O-DU and/or SMO supports notifications from O-RU to O-DU about CU plane status in case it is turned off during any of the sleep mode activations.

To this end, in the O-RU, similar to existing M-Plane models (e.g., similar to energy-saving by transmission blanks parameter that the O-RU may send to the O-DU) a modified set of parameters may be defined to enable the O-RU report energy savings parameters e.g., energy-saving-by-rf-channel-reconfiguration, energy-saving-by-advanced-sleep-modes, energy-saving-by-modify-no-of-spatial-streams, etc. in order to report the supported energy saving modes (i.e., antenna array configuration capability information) and the hardcoded antenna array models along with the other initialization parameters to the O-DU.

Moreover, in an example embodiment, to ensure backward compatibility, the O-RU may mark an above-mentioned energy saving mode flag in the M-Plane yang models (e.g., an urn:o-ran:module-cap:1.0 and an urn:o-ran:hardware:1.0). to false, if O-RU does not support custom configurations or RF channel reconfigurations/antenna array selection approach for ES according to its hardcoded configuration vendor as set forth above.

According to an example embodiment, the TRx control methods to reconfigure the antenna array may include TRx control configurations that are identified by a respective unique configuration identity or name. The antenna array model of said TRx control configurations includes at least one antenna mask (antMask), wherein the antenna mask bits combination may be limited only to the supported TRx control configurations, wherein the antenna mask bits identify a '0' for antenna elements to be turned off and '1' for active elements of the antenna array. Moreover, TRx control configurations include in addition to the mask bits for at least one antenna mask (antMask), antenna layer mask bits for creating at least one antenna layer mask (antLayerMask).

According to an example embodiment, the supported TRx control configurations may comprise a transition time (i.e., different from a wake-up time of the ASMs) that defines a minimum or guaranteed time required to switch from baseline configuration to specific configuration (i.e., switch a baseline 64TRx antenna array to another antenna mask configuration such as, for example, a 32TRx_antenna array model). The transition time associated with each configuration change for the supported TRx control configurations and as a function of sub-carrier spacing may be, for example, for 15 KHz, one slot is 1 millisecond, for 30 KHz, one slot is 0.5 millisecond or 500 microseconds, etc.

According to an example embodiment, the TRx control methods may include control to turn on/off entire RF Transceiver chains and/or Radio Frequency Front End (RFFE) of Radio Frequency (RF) processing unit pertaining to some of the RF channels/antenna elements.

Moreover, according to another example embodiment, the TRx control methods may include control to turn on/off Components, Circuits, IPs, Cores, Computing engines of the digital baseband and O-RAN Fronthaul processing units (i.e., physical components of the O-RU).

According to embodiments of the Advanced Sleep Modes (ASM) having short duration (C-Plane based) sleep modes and sleep modes having a long duration (M Plane based) sleep modes the wake-up latency (i.e., the wake-up time or the go-to-sleep time) for said ASM and the wake-up latency of the TRx control methods may be different and not interfere with (e.g. hinder) each other.

In step 402A, the O-RU receives an antenna array configuration supported by the O-RU via control plane (C-Plane) messaging OR management plane (M-Plane) messaging, wherein the supported antenna array configuration is based on the configuration capability information of the O-RU and a request to reconfigure an antenna array from a higher-layer network function. To this end, step 402A may refer to step 304 in FIG. 3, i.e., the O-DU applies the supported antenna array configuration via control plane (C-Plane) messaging OR management plane (M-Plane) messaging.

According to the example embodiments as set forth in step 401A (i.e., step 301 in FIG. 3), sleep modes may be control plane (C-Plane) or management plane (M-Plane) compatible depending on the sleep duration.

According to example embodiments of the Advanced Sleep Modes (ASM) having short duration (C-Plane based) sleep modes and sleep modes having a long duration (M Plane based) sleep modes the wake-up latency (i.e., the wake-up time or the go-to-sleep time) for said ASM and the wake-up latency of the TRx control methods may be different and not interfere with (e.g. hinder) each other.

According to embodiments of the TRx control methods, the antenna array configuration via control plane (C-Plane) messaging or via management plane (M-Plane) messaging.

In step 403A, the O-RU reconfigures the antenna array configuration of the O-RU based on the supported antenna array configuration for the O-RU (i.e., as provided, for example, from the O-DU).

In step 404A, according to an example embodiment, the O-RU may notify a change of an antenna array configuration from one antenna array configuration to another antenna array configuration via management plane (M-PLANE) messaging or control plane (C-Plane messaging).

For example, the O-RU may notify a configuration change during the transition from one antenna array configuration to another antenna array configuration considering the transition time (i.e., wake-up time). The notification may be to the O-DU via the hierarchical architecture of the O-RAN or the higher-layer network functions (e.g., the SMO, RICs, etc.).

According to an example embodiment, the O-RU may notify an antenna array configuration change (e.g., a back configuration) during the transition from the second antenna array configuration to the first antenna array configuration considering the transition time (i.e., wake-up time). For example, the O-RU notifies the rollback configuration change during the transition from an energy savings mode (i.e., the second antenna array configuration) to the baseline configuration (i.e., the first antenna array configuration) considering the transition time.

The method for implementing a dynamical antenna array reconfiguration from perspective of the O-RU according to steps 401A to 404A may be implemented in at least one apparatus comprising a memory to store instructions and a processor configured to execute instructions.

According to an example embodiment, an apparatus includes a radio unit (O-RU). The O-RU is configured to send configuration capability information to a distributed unit (O-DU) via management plane (M-Plane) messaging. Moreover, the O-RU receives from the O-DU, an antenna array configuration supported by the O-RU via control plane (C-Plane) messaging, wherein the supported antenna array configuration is based on the configuration capability information of the O-RU and a request to reconfigure an antenna array from a higher-layer network function; and based on the supported antenna array configuration for the O-RU, reconfigure the antenna array antenna model.

Referring to the method and apparatus according to the FIG. 4 dynamical antenna array reconfiguration, e.g., a dynamic changing of antenna array configurations such as, for example, switching between one antenna array model to another antenna array model (i.e., muting (e.g., turning off) parts of an antenna array (i.e., antenna elements) along with their respective RF transceiver chains) has the advantage that ES methods can be implemented with maximum efficiency due to exchange of knowledge of the proprietary internal architectures (e.g. the O-RUs read-only (proprietary) parameters).

Figure 4B:
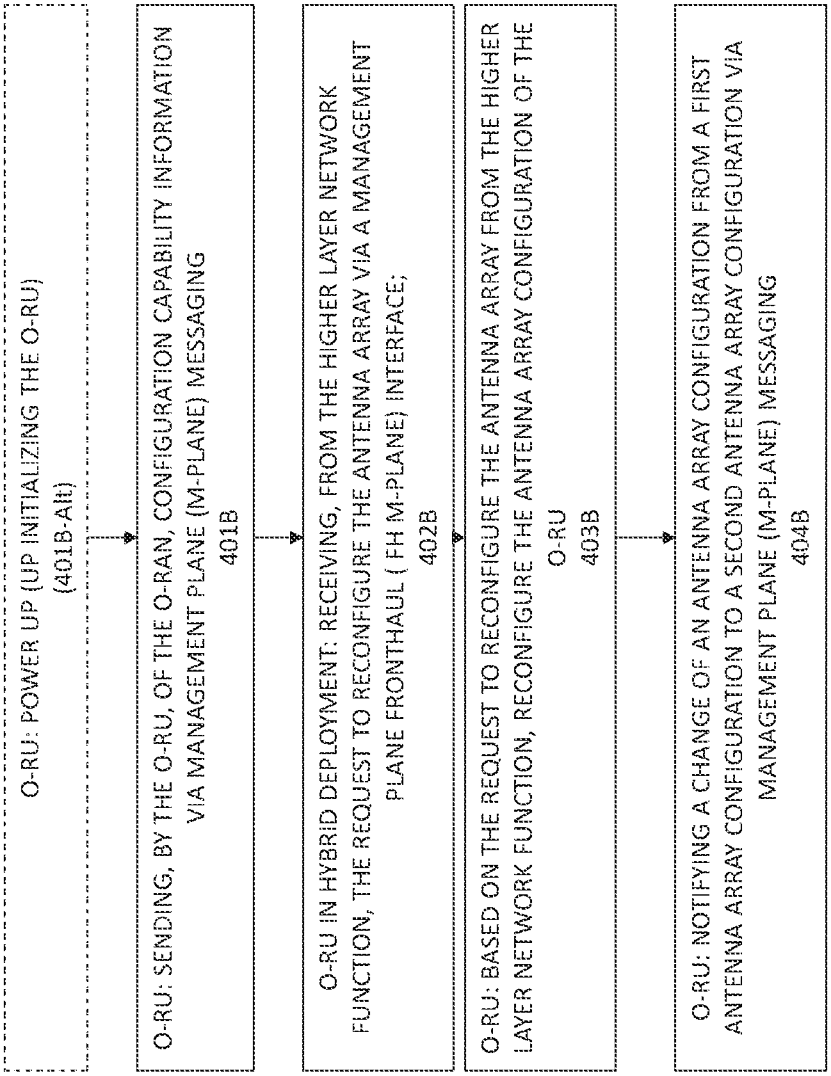
FIG. 4B illustrates a method for implementing a dynamical antenna array reconfiguration in a hybrid deployment from the perspective of an O-RU according to another embodiment.

FIG. 4B illustrates a method for implementing a dynamical antenna array reconfiguration in a hybrid deployment from perspective of the O-RU. Referring to FIG. 4B, in step 401B-Alt, the O-RU powers up and initializes O-RU functionality after, for example, an installation to the inventory of the O-RAN, maintenance, update, etc.

In step 401B, the O-RU sends its configuration capability information via management plane (M-Plane) messaging. Step 301 may refer to step 203. The O-RU configuration capability information explained in step 401B refers to step 301 in FIG. 3 and to step 401A in FIG. 4A, respectively.

According to example embodiment, in step 401B, upon powering up, the O-RU communicates (e.g., sends) its configuration capability information required to perform an antenna array reconfiguration via the M-Plane to the O-DU. In an example embodiment, the O-RU, during start-up, exposes (reports) its capability data (including the antenna configuration capability information) to the O-DU and/or the higher-layer network function via the Fronthaul (FH) interface to support various ES methods (e.g., TRx control methods such as, for example, the RF channel reconfiguration, antenna array selection etc. and sleep modes such as, for example, advance sleep mode, etc.). In another example embodiment, the O-RU communicates (e.g., sends) a plurality of supported antenna models/configurations (i.e., antenna configuration capability information) through the M-Plane and/or the FH M-Plane.

In step 402B, the O-RU receives an request to reconfigure an antenna array configuration via Fronthaul management plane (FH M-Plane) messaging from the higher-layer network function in hybrid deployment. In an example embodiment, the request to reconfigure an antenna array configuration may refer to an antenna array configuration that is antenna array configuration supported by the O-RU. The supported antenna array configuration may be based on the configuration capability information of the O-RU and a request to reconfigure an antenna array from a higher-layer network function.

According to the example embodiments as set forth in step 402A (i.e., step 301 in FIG. 3), sleep modes may be management plane (M-Plane) compatible depending on the sleep duration.

According to example embodiments of the Advanced Sleep Modes (ASM) having having a long duration (M Plane based) sleep modes, the wake-up latency (i.e., the wake-up time or the go-to-sleep time) for said ASM and the wake-up latency of the TRx control methods may be different and not interfere with (e.g. hinder) each other.

In step 403B, the O-RU reconfigures the antenna array configuration of the O-RU based on the request to reconfigure the antenna array from the higher-layer network function (e.g. the SMO, RIC, etc.). For example, based on a supported antenna array configuration for the O-RU (i.e., as provided, for example, from the O-DU to the SMO). The antenna array configuration may be also a baseline configuration or a hardcoded vendor-centric configuration known to the higher-layer network function (e.g. the SMO, RIC, etc.).

In step 404B, according to an example embodiment, the O-RU may notify a change of an antenna array configuration from one antenna array configuration to another antenna array configuration via management plane (M-PLANE).

For example, the O-RU may notify a configuration change during the transition from one antenna array configuration to another antenna array configuration considering the transition time (i.e., wake-up time). The notification may be to the O-DU via the hierarchical architecture of the O-RAN or the higher-layer network functions (e.g., the SMO, RICs, etc.).

According to an example embodiment, the O-RU may notify an antenna array configuration change (e.g., a back configuration) during the transition from the second antenna array configuration to the first antenna array configuration considering the transition time (i.e., wake-up time). For example, the O-RU notifies the rollback configuration change during the transition from an energy savings mode (i.e., the second antenna array configuration) to the baseline configuration (i.e., the first antenna array configuration) considering the transition time (i.e., wake-up time).

The method for implementing a dynamical antenna array reconfiguration from perspective of the O-RU according to steps 401B to 404B may be implemented in at least one apparatus comprising a memory to store instructions and a processor configured to execute instructions.

According to an example embodiment, an apparatus includes a radio unit (O-RU). The O-RU is configured to send configuration capability information to a distributed unit (O-DU) via management plane (M-Plane) messaging. Moreover, the O-RU receives from the higher-layer network function, a request to reconfigure the antenna array via an O1 interface. Moreover, based on the request to reconfigure the antenna array from the higher-layer network function, the O-RU is configured to reconfigure the antenna array configuration of the O-RU. Furthermore, the O-RU may be configured to notify a change of an antenna array configuration from one antenna array configuration to another antenna array configuration via management plane (M-PLANE) messaging.

Referring to the methods and apparatuses according to FIG. 4A and FIG. 4B, the dynamical antenna array reconfiguration (e.g., a dynamic changing of antenna array configurations) such as, for example, switching between one antenna array model to another antenna array model (i.e., muting (e.g., turning off) parts of an antenna array (i.e., antenna elements) along with their respective RF transceiver chains) has the advantage that ES methods can be implemented with maximum efficiency due to exchange of knowledge of the proprietary internal architectures (e.g. the O-RUs read-only (proprietary) parameters).

Figure 5:
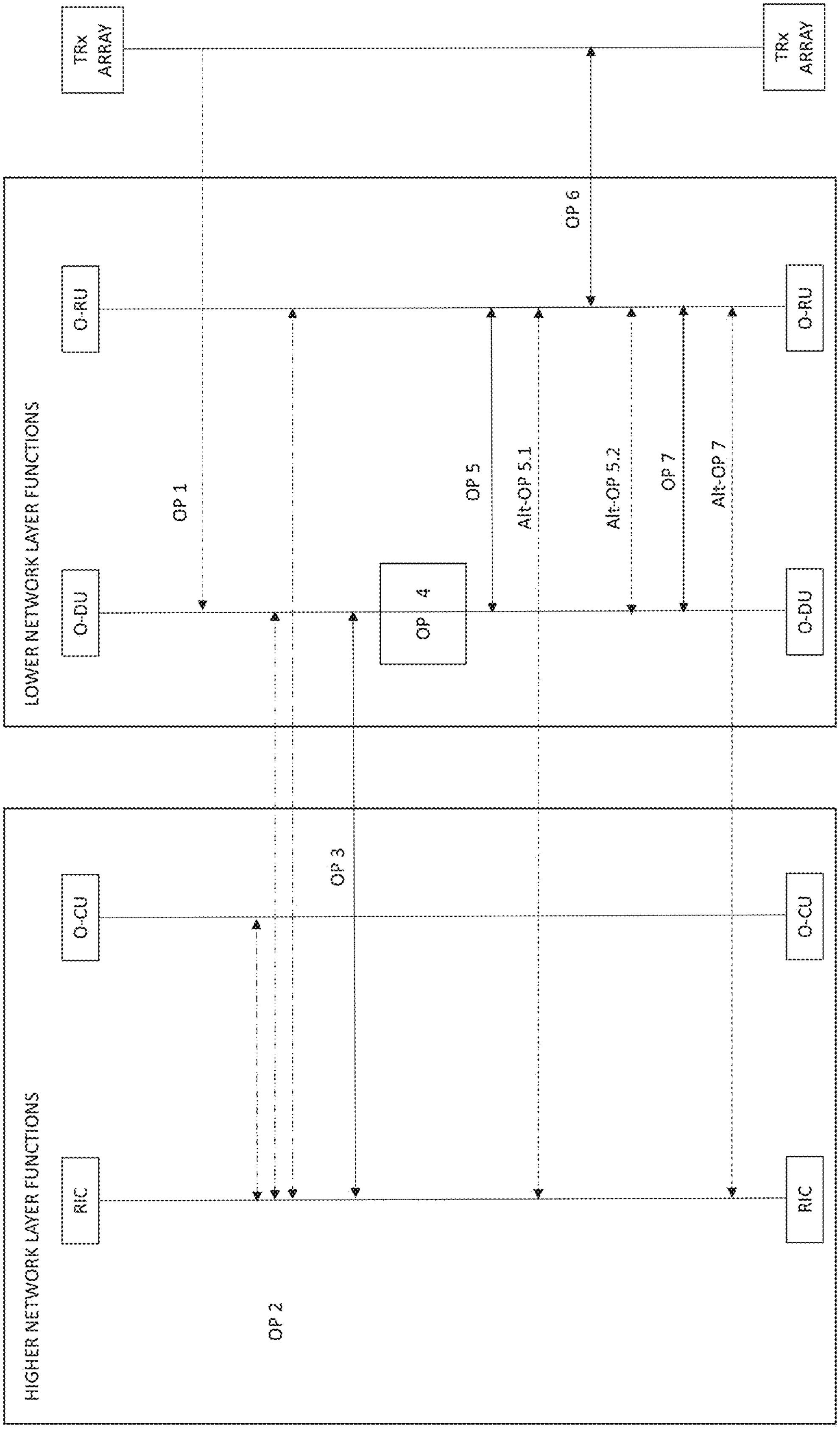
FIG. 5 illustrates an operational flow of a dynamical antenna array configuration according to an embodiment.

FIG. 5 illustrates an operational flow of a dynamical antenna array configuration according to an embodiment. Referring to FIG. 5, in operation 1, the O-RU, for example upon initializing, sends configuration capability information to a distributed unit (O-DU) via management plane (M-Plane) messaging.

In operation 2, the higher-layer network function monitors at least one network parameter via an O1 interface for implementing a dynamical antenna array reconfiguration. For example, the SMO, the RIC, etc. monitors the O-CU packets scheduling, the O-DU packets scheduling and/or the O-RU Policy-Based Routing (PBR)/packets scheduling via the O1 interface of the O-RAN. According to a hierarchal architecture, the associated delays exist in deciding the RF channel reconfiguration based on the network capacity utilization. For example, O-DU perhaps coordinates with packet/PRB scheduling of multiple O-RU's and the O-CU may need to coordinate multiple O-DU's in turn very large number of O-RUs for the network.

In operation 3, based on a predetermined network parameter (i.e., based on the monitored at least one network parameter satisfying a predetermined condition), the higher-layer network function (e.g., the SMO, the RIC, etc.) determines to request an antenna array reconfiguration to the O-DU via the O1 interface.

In an example embodiment, according to the hierarchal architecture, the RIC/CSON requests the O-RU to go in energy saving modes in coordination with O-DU. In an example embodiment the scope of the request may refer to a RF Channel reconfiguration-TRx control and data layer control/no of spatial streams.

In another example embodiment, based on the network usage (i.e., no of active users) at least one of the following approaches (i.e., requests from the higher-layer network function) may be employed: an O-RU TRx control/antenna array selection, a modification of number of single-user SU/multiple-user MU MIMO spatial streams or data layers, a modification of the number of synchronization signal block SSB beams, a modification of the O-RU antenna transmit power, etc.

In operation 4, the O-DU determines an antenna array configuration supported by the O-RU based on the configuration capability information from the O-RU and based on the request to reconfigure an antenna array from the higher-layer network function.

In operation 5, according to the hierarchical architecture of the O-RAN, the O-DU applies the supported antenna array configuration via control plane (C-Plane) messaging or via management plane (M-Plane) messaging (i.e., the O-RU may receive the supported antenna array configuration via C-Plane messaging or via M-Plane messaging.

In an example embodiment, the O-DU may apply TRx control methods to reconfigure the antenna array comprising at least one antenna model to the O-RU via a control plane (C-Plane) messaging. For example, the O-DU sends, via the C-Plane, a message that comprises at least one Section Type 0 message together with the Section Extension (SE) 7 message and a Section Type 4 message together with at least one of SE 10, 11, 16, and 19 messages.

In another example embodiment, the O-DU, via the C-Plane, applies appropriate beam weights and/or an antenna calibration. For example, the O-DU sends the configuration of beam weights and/or an antenna calibration based on the activated antenna model implemented by the O-RU (i.e., the O-DU provides the O-RU with predefined beam weights against the respective configuration or provides beam weights that were dynamically generated to meet the antenna configuration capability information of the O-RU, respectively).

In another example embodiment, the O-DU may schedule the Fronthaul and M-Plane message to activate the supported antenna array configuration the O-RU.

Alternatively, in accordance to the hybrid architecture of the O-RAN, in operation 5.1., based on, for example, network capacity, a traffic scenario, etc., the higher-layer network function (i.e., the SMO, RIC, etc.) requests a radio unit (O-RU) to reconfigure an antenna array. The request may be based on the monitored at least one network parameter satisfying a predetermined condition. For example, the RIC requests the O-RU for RF Channel reconfiguration, antenna selection (NES), etc. through the O1 interface in a hybrid architecture.

Referring to the alternative in operation 5.1., the O-RU reconfigures the antenna array configuration of the O-RU based on the request to reconfigure the antenna array from the higher-layer network function as set forth below in accordance with operation 6.

Based on the network parameter satisfying a network condition, the RIC may decide the number of layers/spatial streams after a RF Channel reconfiguration and/or antenna array selection has been decided based on a Rank Indicator (RI) Value shared by a UE. Moreover, in another example embodiment, the RIC may decide the number of layers/spatial streams based on a traffic scenario.

In operation 6, the O-RU reconfigures the antenna array configuration of the O-RU based on the supported antenna array configuration for the O-RU.

In another example embodiment, the O-RU may implement the beam weight and/or antenna calibration based on an antenna model applied by the O-DU by processing IQ samples provided by the O-DU to shut down appropriate RF chains through an RF interface and thereby modifying the antenna array configuration. To this end, the O-RU may configure the beam weight and/or antenna calibration by activating a 32T32R antenna array pattern within a 64T64R configuration of the TRx array and thereafter request the O-DU to apply the right beam weights for the new configuration.

Moreover, in an example embodiment, the O-RU, when implementing beam weight (s), may also perform an antenna calibration. To this end, the O-RU may turn off the RF transceivers that are associated with the muted antenna elements in order to achieve maximum power saving.

After the reconfiguration according to operation 6, in an alternative operation 5.2., the O-RU notifies the change of an antenna array configuration to the O-DU. To this end, the O-RU notifies the change of antenna array configuration at the O-RU in response to the higher-layer network layer request in alternative operation 5.1. to the O-DU. For example, the O-RU reports a change from a first antenna array configuration to a second antenna array configuration, via management plane (M-PLANE) messaging to the O-DU.

According to example embodiment, the O-RU may configure the beam weights and/or performs an antenna calibration based on at least one antenna model applied by the O-DU.

According to another example embodiment, the OR-RU may process IQ samples obtained from the O-DU in order to modify the antenna array configuration by deactivating (e.g., muting or turning off appropriate RF chains through an RF interface at the TRx array.

According to another example embodiment, OR-RU may process IQ samples to activate a 32T32R configuration within a 64T64R antenna array configuration. In an example embodiment, after the activation of a 32T32R configuration within a 64T64R antenna array configuration, the O-RU may request the O-DU to apply the appropriate beam weights to the (newly) activated from a 32T32R configuration. To this end, the O-RU may perform an antenna calibration based on the (newly) activated 32T32R configuration and may turn off the TRx(s) that are associated with the muted antenna elements in accordance with the (newly) activated 32T32R configuration for maximum energy savings.

In operation 7, the O-RU notifies the configuration change during the transition from one antenna array configuration to another antenna array configuration considering the transition time. For example, the O-RU notifies the configuration change during the transition from baseline configuration (i.e., a first antenna array configuration) to an energy savings mode (i.e., a second antenna array configuration) considering the transition time (i.e., wake-up time).

In an alternative operation 7.1, the O-RU notifies the configuration, for example, from one antenna array configuration to another antenna array configuration to the higher-layer network function via the O1 interface. The notification may consider a transition time (i.e., wake-up time).

For example, the O-RU notifies the configuration change during the transition from baseline configuration (i.e., a first antenna array configuration) to an energy savings mode (i.e., a second antenna array configuration) considering the transition time (i.e., wake-up time).

Figure 6A:
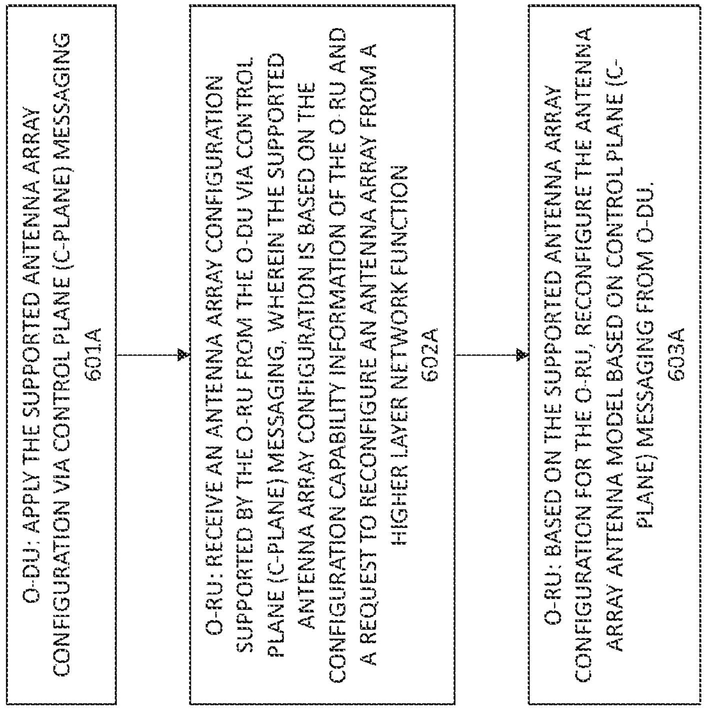
FIG. 6A illustrates a method for a dynamical antenna array configuration via C-plane messaging according to an embodiment.

FIG. 6A illustrates a method for a dynamical antenna array configuration via C-Plane messaging according to an embodiment. Referring to FIG. 5, in step 601A, the O-DU applies an antenna array configuration via control plane (C-Plane) messaging.

In an example embodiment the O-DU may indicate to the O-RU that certain resource blocks or symbols are not to be used (e.g., the O-DU may create idle periods, guard periods, etc.) in said C-Plane Section Type messages (e.g., ST 0 or ST 4 messages). Moreover, the O-DU may utilize non-associated (i.e., reserved or not yet defined) U-Plane messages containing IQ samples (data) for the Section Types (ST 0, ST 4) as set forth above (i.e., at least one of a C-Plane Section Type 0 or Section Type 4 together with at least one of a Section Extensions 10, 11, 16, 19, etc. messages).

In any case, the purpose of using existing, but unused resource blocks or symbols of C-Plane Section Type messages is to inform (apply to) the O-RU that RF signal transmissions (e.g., the radiation of RF signals by certain antenna elements in an antenna array) may be halted during the specified idle interval (e.g., to conserve power or to provide an interval for calibration).

To this end, according to the example embodiment, the O-DU may send, via the C-Plane, at least one message that includes at least one Section Type 0 message together with a Section Extension (SE) 7 message and/or a Section Type (ST) 4 message together with at least one of a SE 10, 11, 16, 19, etc. message.

In an example embodiment, the O-DU may apply a new antenna array model by using Section Extension (SE) 7, messages along with Section type 0 messages, where it is used for the masking/blanking/muting of antenna elements with existing spec (For e.g., SE7, mask the part of eAXC ID designated by ST0 messages) in existing specification. In addition to example embodiment, a Section Type 4, Section extensions 10, 11, 16, and 19 messages can be used during the run time.

Moreover, in another example embodiment, in order to mute the antenna elements for longer duration, C Plane Section type 0 messages can be used to specify set of elements are muted for a longer duration. Section type 0 messages are used to specify unused Blocks or Symbols in UL and DL.

The O-DU may indicate to the O-RU that certain Resource Blocks or symbols will not be used (idle periods, guard periods). Likewise, there are no associated U-Plane messages containing IQ data for this Section Type.

The purpose is to inform the O-RU that transmissions may be halted during the specified idle interval (e.g., power-savings or to provide an interval for calibration). To this end, C-Plane messaging may specify antenna elements to be muted for longer time to save the energy by employing section type 0 messages.

The section type 0 messages may be defined as set forth in the below summary.

TABLE 7.4.2 1

Scheduling and beamforming commands frame format (Section Type 0)
Section Type 0: idle/guard periods

| 0 (msb) | 1 | 2 | 3 | 4 | 5 | 6 | 7 (lsb) | # of bytes | |
|---|---|---|---|---|---|---|---|---|---|
| | transport header, see clause 5.1.3 | | | | | | | 8 | Octet 1 |
| dataDirection | payloadVersion | | | | filterIndex | | | 1 | Octet 9 |
| | | | frameId | | | | | 1 | Octet 10 |

TABLE 7.4.2 1-continued

Scheduling and beamforming commands frame format (Section Type 0)
Section Type 0: idle/guard periods

| 0 (msb) 1 2 3 4 5 6 7 (lsb) | | # of bytes | |
|---|---|---|---|
| subframeId | slotId | 1 | Octet 11 |
| slotId | startSymbolId | 1 | Octet 12 |
| numberOfsections | | 1 | Octet 13 |
| sectionType = 0 | | 1 | Octet 14 |
| timeOffset | | 2 | Octet 15 |
| frameStructure | | 1 | Octet 17 |
| cpLength | | 2 | Octet 18 |
| TRx control method (2 Bits) | Energy saving Duration (6 Bits) | 1 | Octet 20 |
| sectionId | | 1 | Octet 21 |
| sectionId | rb symInc startPrbc | 1 | Octet 22 |
| startPrbc | | 1 | Octet 23 |
| numPrbc | | 1 | Octet 24 |
| reMask[11:4] | | 1 | Octet 25 |
| reMask[3:0] | numSymbol | 1 | Octet 26 |
| ef | reserved (7 bits) | 1 | Octet 27 |
| reserved (8 bits) | | 1 | Octet 28 |
| Section Extensions as indicated by "ef" if any | | var | Octet 29 |
| . . . | | | |
| sectionId | | 1 | Octet N |
| sectionId | rb symInc startPrbc | 1 | N + 1 |
| startPrbc | | 1 | N + 2 |
| numPrbc | | 1 | N + 3 |
| reMask[11:4] | | 1 | N + 4 |
| reMask[3:0] | numSymbol | 1 | N + 5 |
| ef | reserved (7 bits) | 1 | N + 6 |
| reserved (8 bits) | | 1 | N + 7 |
| Section Extensions as indicated by "ef" if any | | var | N + 8 |

NOTE:
Shading: yellow is transport header, pink is radio application header, others are repeated sections.

According to an example embodiment, an antenna element may be masked or muted by not assigning beam weights or beam '0' to the respective antenna elements by respective C-Plane messages. Such C-Plane messaging is possible by a symbol by symbol or slot by slot or PRB by PRB (i.e., for shorter duration energy saving mode as done TDD mode, where Tx chains switched off during UL).

In addition, by sharing the duration along with C plane messaging, the masking or muting by C Plane messaging may be extended to longer duration energy saving mode as well.

In an example embodiment, the O-DU may apply an antenna array configuration for example, for TRx control methods or sleep modes by using an existing specification (messaging protocol) of the CUS Plane.

In another example embodiment, the O-DU may use a C-Plane ST 4 message together with at least one of a SE 10, 11, 16, and 19 message wherever required (e.g., during run time) to apply the a (new) antenna array model to the O-RU. In particular, the O-DU may use the ST 4 command type (ST4CmdType) to apply configuration sets (i.e., a particular antenna model/configuration).

In an example embodiment, according to the C-Plane ST 4 message, the of C-Plane ST 4 message the O-DU uses the specified slot level configuration to apply single/multiple endpoints by employing a common Section Type 4 header followed by single/multiple Section Type 4 command(s) (e.g., ST4CmdType(s)), whereas each of the Section Type 4 commands is used to specify a configuration command that applies to a particular slot.

In another example embodiment, according to the C-Plane ST 4 message together with a Section Extension (SE) 10, the O-DU uses the Section Extension 10 to apply Section Types 1, 3 and 5. To this end, the O-DU utilizes the C-Plane section information for the multiple ports (i.e., layers or Tx/Rx paths) that may be similar except for the beam Identifications (IDs) or User Entity (UE) IDs. As a result, when multiple ports share common section information within the O-RU, the O-DU sends C-Plane sections via corresponding ports (RU_ports) that are merged into one C-Plane section via representative ports using Section Extension 10. On the O-DU side, the O-DU via the M-Plane pre-configures said representative ports by grouping the ports to be merged to represent said ports (at the O-RU). For example, in the case of a C-Plane messaging using an ST4, Section Extension (SE) 10, the O-DU may use a unique eAxC_IDs to address each layer or spatial stream when sending C-Plane and U-Plane messages to the O-RU. Moreover, the SE 10 may be used along with a 'representative eAxC_ID' (configured via M-Plane) to reduce the C-Plane overhead of sending multiple messages by sending one single C-Plane message.

In yet another example embodiment, according to the C-Plane ST 4 message together with a Section Extension (SE) 11, the O-DU uses the Section Extension (SE) 11 to apply flexible beamforming weights to the O-RU. The SE 11 enables the O-DU to provide different beamforming weights for different Physical Resource Blocks (PRBs) within one section to facilitate (e.g., zero-forcing precoding). To this end, the O-DU provides the Number of bundled PRBs per beamforming weights (numBundPrb) parameter that informs the O-RU how many PRBs are bundled together and shares the according beamforming weights.

In another example embodiment, to enable the O-DU to make use of SE 11 as set forth above, the optional "little endian byte order" may be applied to beamforming. weight. in-phase. value/beamforming. weight. q-phase. value (bfwI/bfwQ) fields (i.e., I/Q beamforming weights fields) if chosen via M-plane. In this case, C-Plane ST 4 message together with Section Extension 11 only applies to C-Plane Section Types 1 and 3, respectively.

In yet another example embodiment, according to a C-Plane ST 4 message together with a Section Extension (SE) 16, the O-DU applies antenna mapping in UE channel information-based UL beamforming to the O-RU. Section Extension (SE) 16 may also apply to C-Plane ST 5 messages. Section Extension (SE) 16 includes a bitmask per RX endpoint to indicate the antennas to be pre-combined into the RX endpoint (i.e., eAxC_ID). According to this example embodiment, O-DU may use Section Extension (SE) 16 together with Section Extension 10. In this case, Section Extension (SE) 16 includes a list of the bitmasks to indicate the number of RX endpoints used in Section Extension 10.

In yet another example embodiment, according to a C-Plane ST 4 message together with a Section Extension (SE) 19, the O-DU applies compact beamforming information for multiple antenna ports (i.e., 'port' in the context of this Section Extension 19 refers to logical antenna port) to control the TRx. Section Extension 19 may also apply to C-Plane Section Types (ST) 1 and 3. According to this example embodiment, the O-DU uses Section Extension 19 for sending compact beamforming information for multiple antenna ports. For example, "little endian byte order" may applied to bfwI/bfwQ fields in SE 19. As a result, considering a large number of Channel State Information Reference Signal (CSI-RS) ports and multiple Channel State Information (CSI) resource sets the use of SE 19 has benefits for the Channel State Information Reference Signal (CSI-RS) channel messaging.

In yet another example embodiment, the O-DU may utilize C Plane ST 0 messages to specify a set of antenna elements to be muted (i.e., to apply a (new) antenna array model to be implemented by the O-RU). To this end, unused Blocks or Symbols of the existing Uplink (UL) and Downlink (DL) C-Plane ST 0 messages may be utilized by the O-DU to communicate (apply) (new) antenna array model(s) to be implemented by the O-RU (e.g., to specify the set of antenna elements to be muted). The utilization of C-Plane ST 0 messages has the advantage that the antenna elements of an antenna array may be muted for a longer duration in comparison to other C-Plane messages such as, for example, ST 4 together with at least one of a SE 10, 11, 16, and 19 message because the C-Plane ST 0 messages can be used to dynamically update the antenna array configuration (i.e., dynamically update/generate at least one antenna model comprising the beam weight(s) and/or the necessary antenna calibration of said at least one antenna model)

As a result, a set of specified antenna elements can be muted for a longer time to achieve maximum energy savings by employing the C-Plane ST 0 messages.

Furthermore, in an alternative example embodiment, according to a C-Plane ST 4 message, the O-DU may achieve a sustaining antenna array configuration application may be implemented by numslots commands for long-time energy savings. According to this embodiment, the O-DU, C-Plane ST 4 messages, applies commands to multiple endpoints/eAXC IDs (i.e., array for TD beamforming). To this end, the numslots command is used in C-Plane ST4 messages to specify the number of slots for which an operation (i.e., power save mode) is to be performed.

In step 602A, the O-RU receives an antenna array configuration supported by the O-RU from the O-DU via control plane (C-PLANE) messaging, wherein the supported antenna array configuration is based on the configuration capability information of the O-RU and a request to reconfigure an antenna array from a higher-layer network function.

According to an example embodiment for the use case RF Channel Reconfiguration (i.e., RF Channel Switch Off/On) a sub use case may be defined as TRx Control (i.e., a Tx array control and Rx array control may be claimed separately since antenna masks may be defined per array level. For this sub user case, the O-RU may include at least one of the following activation/deactivation capabilities that may include C-Plane messaging for the activation of Tx control and Rx control via ST4 C Plane message, which contains an appropriate antenna mask value and sleep mode type, C-Plane messaging that supports "numSlots" and "numSlotsExt" fields in ST4 C Plane message to indicate the time duration for which antenna array configuration (antenna mask) is active with the respective sleep mode, C-Plane messaging that supports "numSlots" and "numSlotsExt" that together provision short and long duration sleep, C-Plane messaging that supports a symbol mask that refers to a ST8 based acknowledgment to indicate the correct reception of ST4 C Plane message for the activation of specific RF Channel Switch On/Off (TRx control and/or Data layer control) and/or Advance sleep mode, and a C-Plane messaging that supports a ST8 READY message to indicate the O-RU become active after waking up from undefined sleep duration.

According to another example embodiment for the use case RF Channel Reconfiguration (i.e., RF Channel Switch Off/On) a sub use case may be defined as Data layer Control. For this sub user case, the O-RU may include at least one of the following activation/deactivation capabilities that may include C-Plane messaging for activation of data layer control using ST4 C Plane message, where ST4 message field has mask bits to activate/modify the no of data layers/spatial streams for a given antenna array configuration to save additional energy, C-Plane messaging for the use case to reduce the number of spatial streams/data layers for a given antenna array configuration (e.g., 64T64R can support 16 spatial streams, but traffic/throughput/KPI requirements may restrict the number of spatial streams to 8/4/2 etc.), C-Plane messaging for the use cases of modifying/activating the number of spatial streams per TRx control configuration (e.g., the antenna array) based on the capability reported via the M-Plane (e.g., a 64T64R antenna array may support 16 spatial streams, when it is switched to 32T32R antenna array that supports 8 spatial streams, wherein this number of spatial streams may a reference for the O-DU to activate only 8 spatial streams when switching from 64T64R to 32T32R).

According to another example embodiment for the use case RF Channel Reconfiguration (i.e., RF Channel Switch Off/On) a sub use case may be defined as Advanced Sleep Mode. For this sub user case, the O-RU may include at least one of the following activation/deactivation capabilities that may include C-Plane messaging for sleep mode to be activated by a ST4 C-Plane message, wherein the ST4 C-Plane message may include fields like "sleepMode" to indicate specific sleep mode and "numSlots" and "numSlotsExt" to indicate the time duration for which specific sleep mode to be activated.

In step 603A, the O-RU reconfigures the antenna array antenna model based on control plane (C-PLANE) messaging from O-DU based on the supported antenna array configuration for the O-RU.

Alternatively, in an example embodiment, the O-RU notifies configuration change during the transition from a one antenna array configuration to another antenna array configuration considering the transition time.

Referring to FIG. 6A, the present disclosure provides a notification mechanism between the O-RU and the O-DU without significant changes of existing O-RAN management plane (M-Plane) and control user synchronization plane (CUS-Plane) specifications to execute and indicate a transition from one antenna array configuration to another antenna array configuration while allowing the O-RU to report its O-RU's configuration capability information (e.g., the O-RU internal architecture) to the O-DU and the O-DU to apply an antenna array configuration (e.g., either generated or predefined beam weights to the antenna models) in a manner supported by the configuration capability information of the O-RU.

As a result, the antenna calibration requirements against each antenna array configuration are met and maximum energy saving can be achieved by muting physical and functional components of the O-RU according to the O-RU's configuration capability information (e.g. the O-RU's internal architecture).

Figure 6B:
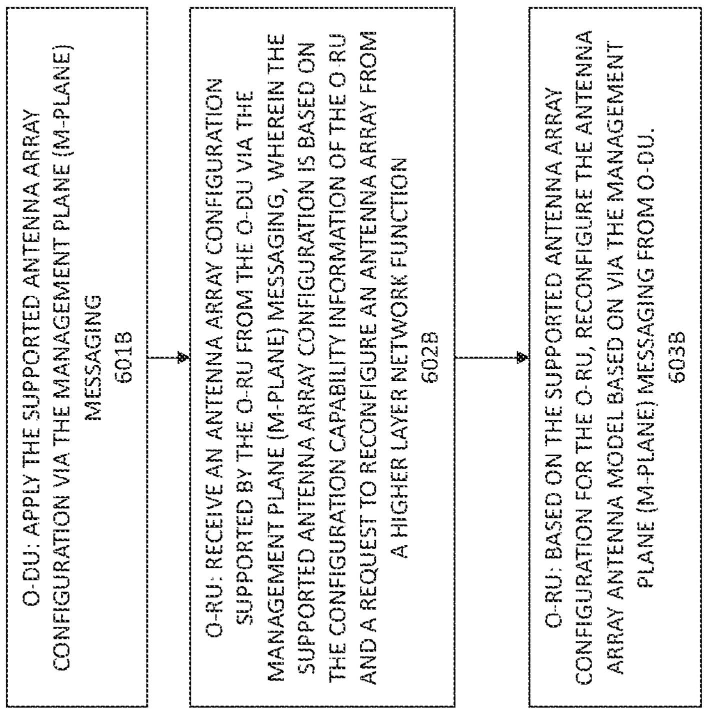
FIG. 6B illustrates a method for a dynamical antenna array configuration via M-plane messaging according to an embodiment.

FIG. 6B illustrates a method for a dynamical antenna array configuration via M-Plane messaging according to an embodiment. Referring to FIG. 6B, in step 601B, the O-DU applies an antenna array configuration via management plane (M-Plane) messaging.

To this end, the M-Plane messaging between the O-DU and O-RU includes at least one Yang module o-ran:uplane-conf:1.0 yang module for each antenna array configuration comprising at least one antenna model applied to the O-RU, wherein for each of the at least one user U-Plane configuration message may include the at least one antenna array configuration information, such as for example, an antenna model, wherein a transport-based endpoint identifier maps the user U-Plane configuration message to an associated O-RU.

In an example embodiment, the operation maintenance (OAM) of both, the O-RU controller (e.g., the O-DU or the SMO) and the O-RU may exchange their states via the M-Plane (e.g., via an o-ran:uplane-conf:1.0 yang module).

In another example embodiment, the configuration change may be requested by the O-RU controller (e.g. the O-DU or the SMO), wherein the O-RU may decode the M-Plane messages and perform the following steps: a shutdown step (e.g., turning off a carrier, functional blocks of a Digital Front End and TRx(s) (i.e., muting the requested TRx(s) (i.e., a specific set of antenna elements) and the respective Radio Frequency Front End (RFFE) Module (i.e., the respective RF chain) according to the requirements (i.e., the requirements according to the requested antenna array reconfiguration from the higher-layer network function and the antenna array models supported by the TRx arrays in accordance with the antenna configuration capability information reported by O-RU upon initialization); and an activation step (e.g. a switching on the required functional blocks and TRx ports in case of a rollback configuration to a baseline configuration, another more suitable energy savings mode, etc.). The activation step may be realized by mapping between low-level-t[r]x-link, static-low-level-t[r]x-endpoint, and low-level-t[r]x-endpoint during the implementation of reconfiguration based on the TRx control methods to reconfigure the antenna array.

According to an example embodiment, an antenna array model to be activated is chosen from predefined models that were reported by O-RU as its capability (i.e., based on the configuration capability information from the O-RU and based on the request to reconfigure an antenna array from the higher-layer network function, the O-DU determines an antenna array configuration (e.g., an antenna array model) supported by the O-RU.

The activation of specific antenna array configuration can be done by the bit-masking an baseline antenna array (i.e., an bit-masking method). According to the bit-mask method, the O-DU on top of baseline antenna array configuration (e.g., full antenna array model), a bit-masking using the following Yang model according may be sent to the O-RU.

```
    description "Y dimension of position of leftmost, bottom array element";
  }
  leaf z {
    type decimal64 {
      fraction-digits 4;
      }
    units Meter;
    description "Z dimension of position of leftmost, bottom array element";
    }
  }
//From the above commands, O-DU able to read baseline antenna array model. On top of this,
bit masking can be applied according to the expected configuration.
//Beam weights after enabling energy savings mode; How O-DU will generate the beam weights
for the new antenna array configuration that has less no of elements than the baseline
configuration.
grouping endpoint-beam-capacity {
  leaf max-beams-per-symbol {
    type uint16 {
      range "min .. 32767";
    }
  description
    "Max number of beams within one symbol that can be processed by endpoint
    or processed collectively by group of endpoints sharing capacity
    If the parameter is absent or if value 0 is reported for the parameter,
    then the endpoint does not support beamforming operation.";
  }
```

-continued

```
// Gain correction required after reconfiguration to be considered. Since change in RF Channel
configuration, no of beams, no of spatial streams etc... will definitely cause the change in gain
values.
  leaf gain-correction {
    type decimal64 {
      fraction-digits 4;
    }
```

According to an example embodiment, the OAM of O-RU may indicate its operational state as transmitting it to the O-RU controller, whereas the O-DU state changes, accordingly. As a result, in case the higher-layer network function (SMO, RIC, etc.) requests the O-DU, the O-DU may start scheduling the antenna array model data according to the new configuration.

According to an example embodiment, the supported antenna array configuration may be communicated in an o-ran:uplane-conf:1.0 Yang model structure. The parameters of the antenna array configuration such as for example, the name, index, reference, etc. to identify the antenna array configuration (e.g., the configuration set number), the number of antenna elements of the particular configuration set, an array model to be applied (or an offset value that defines the start and end antenna elements to be activated or muted in the TRx array), the number of spatial streams supported against each antenna model are input to the o-ran:uplane-conf:1.0 Yang model structure, wherein each configuration that is applied by the O-DU during an ES mode is copied into the U-plane configuration message.

In an example embodiment, the number of antenna elements in a new antenna array along with parameters and associated endpoint mapping i.e., Tx/Rx array carrier and Tx/Rx links are configured using the M-Plane messaging (e.g., using YANG models such as o-ran:uplane-conf:1.0, urn:o-ran:beamforming:1.0, etc.).

To this end, according to the M-Plane messaging approach, the O-DU communicates the number of elements (i.e., antenna elements) of an (new) antenna array configuration to be implemented by the O-RU along with antenna array model parameters and associated endpoint mapping (i.e., Tx/Rx array carrier and Tx/Rx links are configured using M-Plane yang models (e.g., the o-ran:uplane-conf:1.0 and the urn:o-ran:beamforming:1.0).

To this end, according to parameters of the respective M-Plane yang models (e.g., o-ran:uplane-conf:1.0 and urn:o-ran:beamforming:1.0) are updated to apply the (new) antenna array model/configuration to be implemented by the O-RU.

For example, in the respective M-Plane yang models (e.g., o-ran:uplane-conf:1.0 and urn:o-ran:beamforming:1.0) the parameter may include at least one of a total no of elements (antenna elements), a number of elements (in the row(s) and column(s)) of the antenna array, an offset antenna array model size and/or a bitmask value which defines a pre-defined antenna array pattern, etc. are updated dynamically to generate the (new) antenna array model/configuration to be implemented by the O-RU.

The respective M-Plane yang models (e.g., o-ran:uplane-conf:1.0 and urn:o-ran:beamforming:1.0) may comprise the following parameters

```
| +--rw transport-qualified-processing-element? -> /o-ran-pe:processing-elements/additional-
transport-session-type-elements[o-ran-pe:transport-session-type = current( )/../transport-session-
type]/ru-elements/name {feat:MULTIPLE-TRANSPORT-SESSION-TYPE}?
| +--rw tx-array-carrier -> /user-plane-configuration/tx-array-carriers/name
| +--rw low-level-tx-endpoint -> /user-plane-configuration/low-level-tx-endpoints/name
+--rw antenna-array-configuration* [id] {feat:ANTENNA-ARRAY-CONFIGURATION}?
| +--rw configuration set id uint16
| +--rw total no of elements uint16
| +--rw no of elements in row uint16
| +--rw no of elements in column uint16
| +--rw offset decimal 64 //Offset value to define new configurations
| +--rw no of spatial streams supported
| +--rw amount of energy saving unit16
+--ro rx-arrays* [name]
| +--ro name string
| +--ro configuration set id uint16
| +--ro total no of elements uint16
| +--ro number-of-rows uint16
| +--ro number-of-columns uint16
| +--ro number-of-array-layers uint8
| +--ro horizontal-spacing? decimal64
| +--ro vertical-spacing? decimal64
| +--ro offset decimal64 //Offset value of antenna array model
| +--ro amount of energy saving unit16
| +--ro no of spatial streams supported unint16
| +--ro normal-vector-direction
|| +--ro azimuth-angle? decimal64
|| +--ro zenith-angle? decimal64
| +--ro leftmost-bottom-array-element-position
|| +--ro x? decimal64
|| +--ro y? decimal64
|| +--ro z? decimal64
```

These parameters as forth above may be updated to apply the new antenna array model/configuration.

In another example embodiment, the higher-layer network function (SMO, NRT-RIC, nRT-RIC) may control the number of layers/spatial streams. In this case, for example, the higher-layer network function may request the O-DU to apply the number of spatial streams to be supported against the respective TRx/antenna model via the M Plane to O-RU. To this end, the M-Plane use an o-ran:uplane-conf:1.0.yang module an defines the spatial streams supported against each antenna model, accordingly.

In step 602B, the O-RU receives an antenna array configuration supported by the o-ru from the o-du via the management plane (M-Plane) messaging, wherein the supported antenna array configuration is based on the configuration capability information of the O-RU and a request to reconfigure an antenna array from a higher-layer network function.

According to an example embodiment for the use case RF Channel Reconfiguration (i.e., RF Channel Switch Off/On) a sub use case may be defined as TRx Control (i.e., a Tx array control and Rx array control may be claimed separately since antenna masks may be defined per array level. For this sub user case, the O-RU receives an antenna array configuration supported by the O-RU from the O-Du via the management plane (M-Plane) messaging, wherein the supported antenna array configuration may include among other commands to activate and deactivate the O-RU at least one of a command that O-DU sets trx-control-based-energy-saving enabled to "true" using "o-ran.hardware.yang" module, here 1 means sleep and 0 means awake/active, a command that O-DU sends <rpc> <edit-config> <antenna-mask> to activate specific TRx control (in Tx and/or Rx antenna array) configuration or bring back to base line antenna array (antenna mask→all o's/l's based on implementation), a command to change beam weights and antenna calibration during TRx control activation, a command that the O-RU sends RPC reply to O-DU to indicate the correct reception of the above RPC by sending "ok". Moreover, in another example embodiment for this sub user case, the SMO may subscribe to the O-DU and/or the O-RU for a notification to indicate TRx control activation/deactivation state change with appropriate parameters.

According to another example embodiment for the use case RF Channel Reconfiguration (i.e., RF Channel Switch Off/On), a sub use case may be defined as TRx Control. For this sub user case, the supported antenna array configuration may include among other commands to activate and deactivate the O-RU at least one of a command that O-DU sets trx-control-based-energy-saving enabled to "true" using "o-ran.hardware.yang" module, here 1 means sleep and 0 means awake/active, a command that O-DU sends <rpc> <edit-config> <antenna-mask> to activate specific TRx control (in Tx and/or Rx antenna array) configuration or bring back to base line antenna array (antenna mask→all o's/l's based on implementation), a command to change beam weights and antenna calibration during TRx control activation, a command that the O-RU sends RPC reply to O-DU to indicate the correct reception of the above RPC by sending "ok". Moreover, in another example embodiment for this sub user case, the SMO may subscribe to the O-DU and/or the O-RU for a notification to indicate TRx control activation/deactivation state change with appropriate parameters.

According to another example embodiment for the use case RF Channel Reconfiguration (i.e., RF Channel Switch Off/On) a sub use case may be defined as Hibernate sleep. For this sub user case, the O-RU receives an antenna array configuration supported by the O-RU from the O-Du via the management plane (M-Plane) messaging, wherein the supported antenna array configuration may include among other commands to activate and deactivate the O-RU at least one of a command that the O-DU sets energy-saving enabled to "True" using "o-ran.hardware.yang" module, a command that the O-DU sends the <rpc> <edit-config> <[r]x-array-carrier:: ACTIVE> with the value "SLEEP" or "INACTIVE" to O-RU to put to sleep or deactivate the carrier. Then O-RU change the [tr]x-array-carrier:: STATE to DISABLED through BUSY, a command that the O-DU uses appropriate RPCs (i.e., <edit-config> and <delete-config> to deconfigure or remove the carrier(s) in O-RU or that the O-RU may perform this operation by itself with its internal logic during the long sleep (e.g., this command may provision more energy saving as the associated circuits could be turned off), a command to turn off the C-Plane, U-Plane, S-Plane, and M-Plane circuits if all carriers are removed/deconfigured during hibernate (long/deep) sleep, and command that the O-DU may turn off the C-Plane, U-Plane, S-Plane, and M-Plane circuits by sending appropriate commands/rpcs, a command that the O-RU itself with its internal logic may turn off the C-Plane, U-Plane, S-Plane, and M-Plane circuits, a command to turn off M-Plane (Netconf Supervision monitoring) and CU-Plane monitoring circuits (e.g. the turning off command for monitoring circuits may be applied on top of both TRx control and Advanced sleep mode-based energy saving use cases in case of long duration energy saving), a command that the O-RU sends a RPC reply to O-DU to indicate the correction reception of the above RPC by sending "ok". Moreover, in another example embodiment for this sub user case, the SMO may subscribe to O-DU and/or O-RU for the notifications to indicate carrier state change and activation/deactivation state change for TRx control and advanced sleep mode with appropriate parameters.

In step 603B, the O-RU reconfigures the antenna array antenna model based on via the management plane (M-Plane) messaging from O-DU based on the supported antenna array configuration for the O-RU.

Alternatively, in an example embodiment, the O-RU notifies configuration change during the transition from a one antenna array configuration to another antenna array configuration considering the transition time (i.e., wake-up time).

Referring to FIG. 6B, the notification mechanism between the O-RU and the O-DU without significant changes of existing O-RAN M-Plane specifications to execute and indicate a transition from one antenna array configuration to another antenna array configuration allows the O-RU to report its O-RU's configuration capability information (e.g., the O-RU internal architecture) to O-DU. As a result, the antenna calibration requirements against each antenna array configuration are met and maximum energy saving can be achieved by muting physical and functional components of the O-RU according to the O-RU's configuration capability information (e.g., the O-RU's internal architecture).

Figure 7:
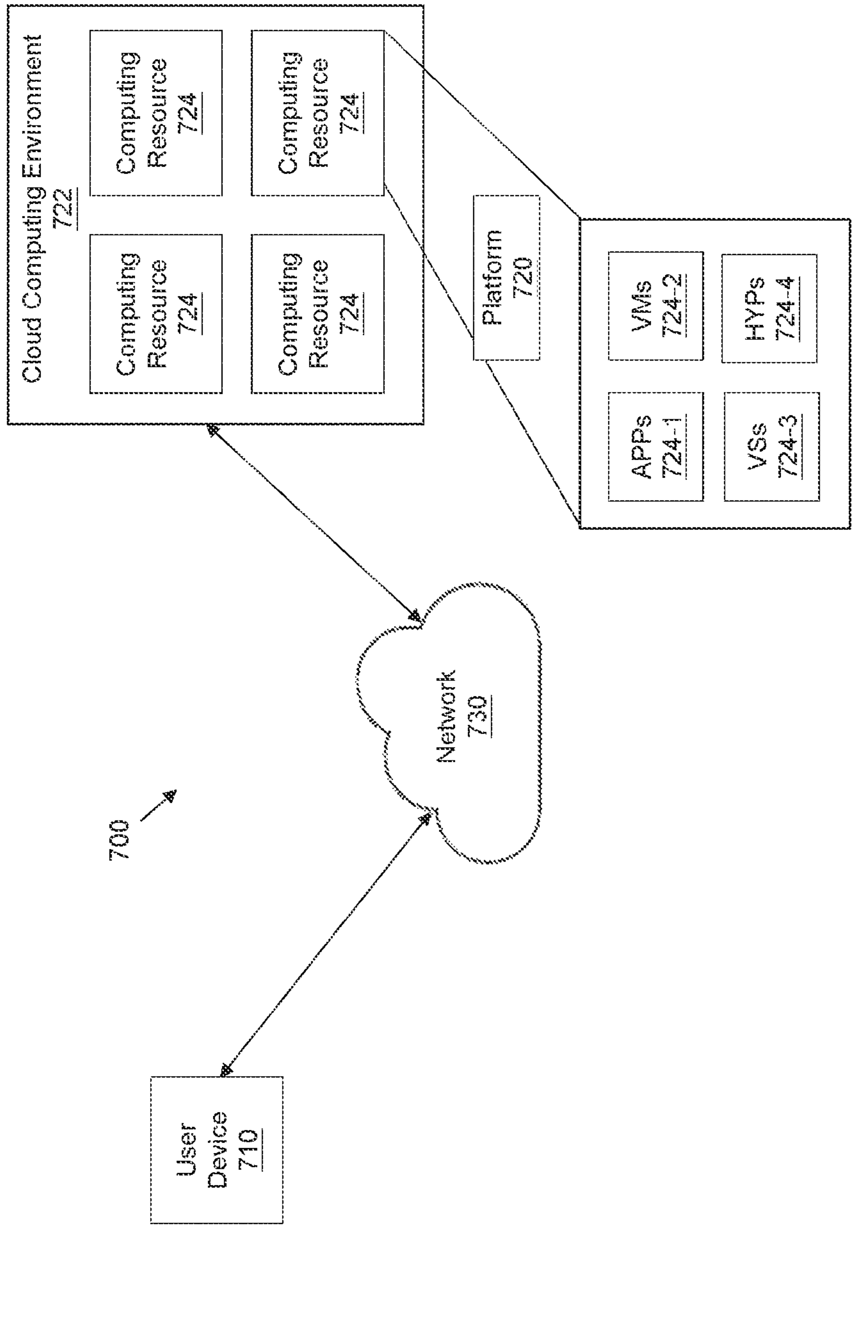
FIG. 7 is a diagram of an example environment in which systems and/or methods, described herein, may be implemented.

FIG. 7 is a diagram of an example environment 700 in which systems and/or methods, described herein, may be implemented. As shown in FIG. 7, environment 700 may include a user device 710, a platform 720, and a network 730. Devices of environment 700 may interconnect via wired connections, wireless connections, or a combination of wired and wireless connections. In embodiments, any of the functions and operations described with reference to FIG. 1 above may be performed by any combination of elements illustrated in FIG. 8.

User device 710 includes one or more devices capable of receiving, generating, storing, processing, and/or providing information associated with platform 720. For example, user device 710 may include a computing device (e.g., a desktop computer, a laptop computer, a tablet computer, a handheld computer, a smart speaker, a server, etc.), a mobile phone (e.g., a smartphone, a radiotelephone, etc.), a wearable device (e.g., a pair of smart glasses or a smart watch), or a similar device. In some implementations, user device 710 may receive information from and/or transmit information to platform 720.

Platform 720 includes one or more devices capable of receiving, generating, storing, processing, and/or providing information. In some implementations, platform 720 may include a cloud server or a group of cloud servers. In some implementations, platform 720 may be designed to be modular such that certain software components may be swapped in or out depending on a particular need. As such, platform 720 may be easily and/or quickly reconfigured for different uses.

In some implementations, as shown, platform 720 may be hosted in cloud computing environment 722. Notably, while implementations described herein describe platform 720 as being hosted in cloud computing environment 722, in some implementations, platform 720 may not be cloud-based (i.e., may be implemented outside of a cloud computing environment) or may be partially cloud-based.

Cloud computing environment 722 includes an environment that hosts platform 720. Cloud computing environment 722 may provide computation, software, data access, storage, etc., services that do not require end-user (e.g., user device 710) knowledge of a physical location and configuration of system(s) and/or device(s) that hosts platform 720. As shown, cloud computing environment 722 may include a group of computing resources 724 (referred to collectively as "computing resources 724" and individually as "computing resource 724").

Computing resource 724 includes one or more personal computers, a cluster of computing devices, workstation computers, server devices, or other types of computation and/or communication devices. In some implementations, computing resource 724 may host platform 720. The cloud resources may include compute instances executing in computing resource 724, storage devices provided in computing resource 724, data transfer devices provided by computing resource 724, etc. In some implementations, computing resource 724 may communicate with other computing resources 724 via wired connections, wireless connections, or a combination of wired and wireless connections.

Figure 8:
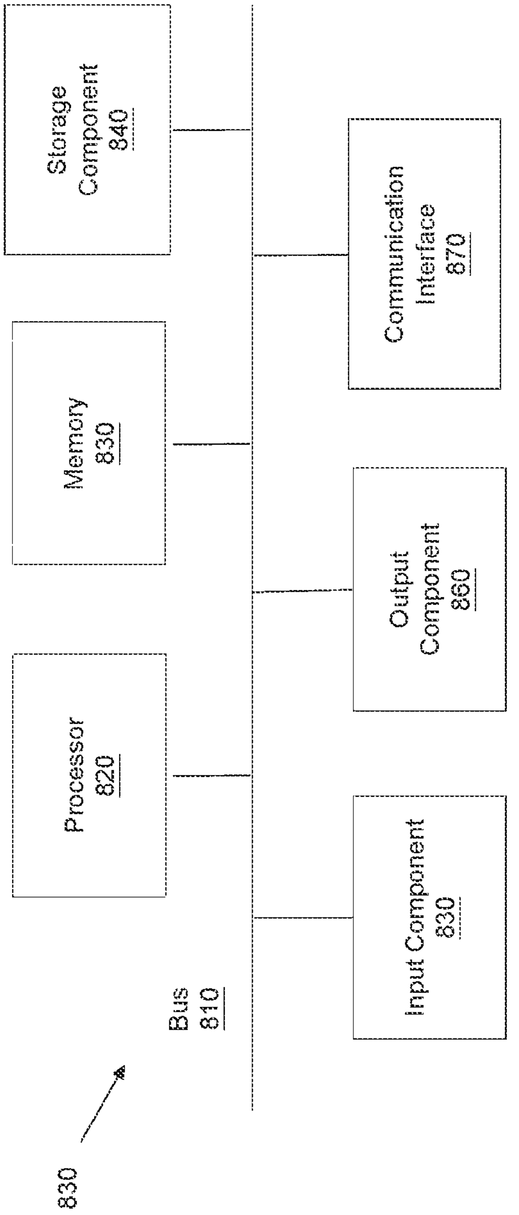
FIG. 8 is a diagram of example components of a device according to an embodiment.

As further shown in FIG. 8, computing resource 724 includes a group of cloud resources, such as one or more applications ("APPs") 724-1, one or more virtual machines ("VMs") 724-2, virtualized storage ("VSs") 724-3, one or more hypervisors ("HYPs") 724-4, or the like.

Application 724-1 includes one or more software applications that may be provided to or accessed by user device 710. Application 724-1 may eliminate the need to install and execute the software applications on user device 710. For example, application 724-1 may include software associated with platform 720 and/or any other software capable of being provided via cloud computing environment 722. In some implementations, one application 724-1 may send/receive information to/from one or more other applications 724-1, via virtual machine 724-2.

Virtual machine 724-2 includes a software implementation of a machine (e.g., a computer) that executes programs like a physical machine. Virtual machine 724-2 may be either a system virtual machine or a process virtual machine, depending upon use and degree of correspondence to any real machine by virtual machine 724-2. A system virtual machine may provide a complete system platform that supports the execution of a complete operating system ("OS"). A process virtual machine may execute a single program and may support a single process. In some implementations, virtual machine 724-2 may execute on behalf of a user (e.g., user device 710), and may manage infrastructure of cloud computing environment 722, such as data management, synchronization, or long-duration data transfers.

Virtualized storage 724-3 includes one or more storage systems and/or one or more devices that use virtualization techniques within the storage systems or devices of computing resource 724. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 724-4 may provide hardware virtualization techniques that allow multiple operating systems (e.g., "guest operating systems") to execute concurrently on a host computer, such as computing resource 724. Hypervisor 724-4 may present a virtual operating platform to the guest operating systems and may manage the execution of the guest operating systems. Multiple instances of a variety of operating systems may share virtualized hardware resources.

Network 730 includes one or more wired and/or wireless networks. For example, network 730 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 7 are provided as an example. In practice, there may be additional devices and/or networks, fewer devices and/or networks, different devices and/or networks, or differently arranged devices and/or networks than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) of environment 700 may perform one or more functions described as being performed by another set of devices of environment 700.

FIG. 8 is a diagram of example components of a device 800. Device 800 may correspond to user device 710 and/or platform 720. As shown in FIG. 8, device 800 may include a bus 810, a processor 820, a memory 830, a storage component 840, an input component 850, an output component 860, and a communication interface 870.

Bus 810 includes a component that permits communication among the components of device 800. Processor 820 may be implemented in hardware, firmware, or a combination of hardware and software. Processor 820 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Memory 830 includes a random-access memory (RAM), a read-only memory (ROM), and/or another type of dynamic or static storage device (e.g., a flash memory, a magnetic memory, and/or an optical memory) that stores information and/or instructions for use by processor 820.

Storage component 840 stores information and/or software related to the operation and use of device 800. For example, storage component 840 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive. Input component 850 includes a component that permits device 800 to receive information, such as via user input (e.g., a touch screen display, a keyboard, a keypad, a mouse, a button, a switch, and/or a microphone). Additionally, or alternatively, input component 850 may include a sensor for sensing information (e.g., a global positioning system (GPS) component, an accelerometer, a gyroscope, and/or an actuator). Output component 860 includes a component that provides output information from device 800 (e.g., a display, a speaker, and/or one or more light-emitting diodes (LEDs)).

Communication interface 870 includes a transceiver-like component (e.g., a transceiver and/or a separate receiver and transmitter) that enables device 800 to communicate with other devices, such as via a wired connection, a wireless connection, or a combination of wired and wireless connections. Communication interface 870 may permit device 800 to receive information from another device and/or provide information to another device. For example, communication interface 870 may include an Ethernet interface, an optical interface, a coaxial interface, an infrared interface, a radio frequency (RF) interface, a universal serial bus (USB) interface, a Wi-Fi interface, a cellular network interface, or the like.

Device 800 may perform one or more processes described herein. Device 800 may perform these processes in response to processor 820 executing software instructions stored by a non-transitory computer-readable medium, such as memory 830 and/or storage component 840. A computer-readable medium is defined herein as a non-transitory memory device. A memory device includes memory space within a single physical storage device or memory space spread across multiple physical storage devices.

Software instructions may be read into memory 830 and/or storage component 840 from another computer-readable medium or from another device via communication interface 870. When executed, software instructions stored in memory 830 and/or storage component 840 may cause processor 820 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 8 are provided as an example. In practice, device 800 may include additional components, fewer components, different components, or differently arranged components than those shown in FIG. 8. Additionally, or alternatively, a set of components (e.g., one or more components) of device 800 may perform one or more functions described as being performed by another set of components of device 800.

In embodiments, any one of the operations or processes of FIGS. 2 to 6 may be implemented by or using any one of the elements illustrated in FIGS. 1, 7 and 8. It is understood that other embodiments are not limited thereto and may be implemented in a variety of different architectures (e.g., bare metal architecture, any cloud-based architecture or deployment architecture such as Kubernetes, Docker, OpenStack, etc.).

The foregoing disclosure provides illustration and description but is not intended to be exhaustive or to limit the implementations to the precise form disclosed. Modifications and variations are possible in light of the above disclosure or may be acquired from practice of the implementations.

Some embodiments may relate to a system, a method, and/or a computer-readable medium at any possible technical detail level of integration. Further, one or more of the above components described above may be implemented as instructions stored on a computer-readable medium and executable by at least one processor (and/or may include at least one processor). The computer-readable medium may include a computer-readable non-transitory storage medium (or media) having computer-readable program instructions thereon for causing a processor to carry out operations.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects or operations.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer-readable media according to various embodiments. In this regard, each block in the flowchart or block diagrams may represent a microservice(s), module, segment, or portion of instructions, which comprises one or more executable instructions for implementing the specified logical function(s). The method, computer system, and computer-readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that apparatuses and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the apparatuses and/or methods based on the description herein.

Various further respective aspects and features of embodiments of the present disclosure may be defined by the following items:

Item [1] An apparatus includes: a higher-layer network function of an open radio access network (O-RAN), the higher-layer network function configured to: monitor, for implementing a dynamical antenna array reconfiguration, at least one network parameter via an O1 interface; and request, based on the monitored at least one network parameter satisfying a predetermined condition, a distributed unit (O-DU) to reconfigure an antenna array.

Item [2] The apparatus according to Item [1], request, based on the monitored at least one network parameter satisfying a predetermined condition, a radio unit (O-RU) to reconfigure an antenna array via a management plane Fronthaul (FH M-Plane).

Item [3] An apparatus includes: a distributed unit (O-DU), the O-DU configured to: receive configuration capability information from a radio unit (O-RU) via management plane (M-Plane) messaging; receive a request to reconfigure an antenna array from a higher-layer network function; based on the configuration capability information from the O-RU and based on the request to reconfigure the antenna array from the higher-layer network function, determine an antenna array configuration supported by the O-RU; and activate the supported antenna array configuration via control plane (C-Plane) messaging.

Item [4] The apparatus according to Item [3], wherein the O-DU is configured to: activate the supported antenna array configuration via the management plane (M-Plane) messaging.

Item [5] The apparatus according to any one of Items [3 or 4], wherein the supported antenna array configuration is at least one of a configuration for implementing a TRx Control and a configuration for implementing at least one of sleep mode, wherein the configuration for implementing the at least one of sleep mode comprising at least one of a configuration for implementing an Advanced Sleep Mode and Deep Sleep.

Item [6] An apparatus includes: a radio unit (O-RU), the O-RU configured to: send, to a distributed unit (O-DU), configuration capability information via management plane (M-Plane) messaging; receive, from the O-DU, an antenna array configuration supported by the O-RU via control plane (C-Plane) messaging, wherein the supported antenna array configuration is based on the configuration capability information of the O-RU and a request to reconfigure the antenna array from the higher-layer network function; and based on the supported antenna array configuration for the O-RU, reconfigure the antenna array configuration of the O-RU.

Item [7] The apparatus according to Item [6], wherein the O-RU may be further configured to: receive, from the higher-layer network function, the request to reconfigure the antenna array via a management plane Fronthaul (FH M-Plane) Interface; and based on the request to reconfigure the antenna array from the higher-layer network function, reconfigure the antenna array configuration of the O-RU.

Item [8] The apparatus according to Item [7], wherein the O-RU may be further configured to: receive, from the O-DU, an antenna array configuration supported by the O-RU via management plane (M-Plane) messaging, wherein the supported antenna array configuration is based on the configuration capability information of the O-RU and a request to reconfigure an antenna array from a higher-layer network function.

Item [9] The apparatus according to any one of Items [6 to 8], wherein the supported antenna array configuration is at least one of a configuration for implementing a TRx Control, an Advanced Sleep Mode and Deep Sleep.

Item [10] The apparatus according to any one of Items [6 to 9], wherein the O-RU may be further configured to: notify a configuration change from one antenna array configuration to another antenna array configuration via management plane (M-Plane) messaging.

Item [11] The apparatus according to any one of Items [6 to 10], wherein the O-RU may be further configured to: upon initializing, send configuration capability information via management plane (M-Plane) messaging.

Item [12] A method includes: monitoring, by a higher-layer network function of an open radio access network (O-RAN), for implementing a dynamical antenna array reconfiguration, at least one network parameter via an O1 interface; and based on the monitored at least one network parameter satisfying a predetermined condition, requesting, by the higher-layer network function, a distributed unit (O-DU) to reconfigure an antenna array.

Item [13] The method according to Item [12], requesting, by the higher-layer network function, based on the monitored at least one network parameter satisfying a predetermined condition, a radio unit (O-RU) to reconfigure an antenna array via a management plane Fronthaul (FH M-Plane).

Item [14] A method includes: receiving, by a distributed unit (O-DU), configuration capability information from a radio unit (O-RU) via management plane (M-Plane) messaging; receiving, by the O-DU, a request to reconfigure an antenna array from a higher-layer network function; based on the configuration capability information from the O-RU and based on the request to reconfigure the antenna array from the higher-layer network function, determining, by the O-DU, an antenna array configuration supported by the O-RU; and activating, by the O-DU, the supported antenna array configuration via control plane (C-Plane) messaging.

Item [15] The method according to Item [14], wherein the method may further include: activating, by the O-DU, the supported antenna array configuration via the management plane (M-Plane) messaging.

Item [16] The method according to any one of Items [14 or 15], wherein the supported antenna array configuration is at least one of a configuration for implementing a TRx Control and a configuration for implementing at least one of sleep mode, wherein the configuration for implementing the at least one of sleep mode comprising at least one of a configuration for implementing an Advanced Sleep Mode and Deep Sleep.

Item [17] A method includes: sending, by a radio unit (O-RU) to a distributed unit (O-DU), configuration capability information via management plane (M-Plane) messaging; receiving, by the O-RU from the O-DU, an antenna array configuration supported by the O-RU via control plane (C-Plane) messaging, wherein the supported antenna array configuration is based on the configuration capability information of the O-RU and a request to reconfigure the antenna array from the higher-layer network function; and based on the supported antenna array configuration for the O-RU, reconfiguring, by the O-RU, the antenna array configuration of the O-RU.

Item [18] The method according to Item [17], wherein the method may further include: receiving, by the O-RU from the higher-layer network function, the request to reconfigure the antenna array via a management plane Fronthaul (FH M-Plane) Interface; and based on the request to reconfigure the antenna array from the higher-layer network function, reconfigure the antenna array configuration of the O-RU.

Item [19] The method according to any one of Items [17 or 18], wherein the method may further include: receiving, from the O-DU, an antenna array configuration supported by the O-RU via management plane (M-Plane) messaging, wherein the supported antenna array configuration is based on the configuration capability information of the O-RU and a request to reconfigure an antenna array from a higher-layer network function.

Item [20] The method according to any one of Items [17 to 19], wherein the supported antenna array configuration is at least one of a configuration for implementing a TRx Control and a configuration for implementing at least one of sleep mode, wherein the configuration for implementing the at least one of sleep mode comprising at least one of a configuration for implementing an Advanced Sleep Mode and Deep Sleep.

Item [21] The method according to any one of Items [17 to 20], wherein the method may further include: notifying, by the O-RU, a configuration change from one antenna array configuration to another antenna array configuration via management plane (M-Plane) messaging.

Item [22] The method according to any one of Items [17 to 21], wherein the method may further include: upon initializing, sending, by the O-RU, configuration capability information via management plane (M-Plane) messaging.

What is claimed is:

1. An apparatus comprising:

a higher-layer network function of an open radio access network (O-RAN), the higher-layer network function configured to:

monitor, for implementing a dynamical antenna array reconfiguration, at least one network parameter via an O1 interface; and request, based on the monitored at least one network parameter satisfying a predetermined condition, a distributed unit (O-DU) to reconfigure an antenna array of a radio unit (O-RU) while the O-RU is processing radio signals.

2. The apparatus as claimed in claim 1, wherein the O-DU activates an alternative antenna array configuration to the antenna array of the O-RU via a management plane Fronthaul (FH M-Plane) while the O-RU is processing radio signals.

3. An apparatus comprising:

a distributed unit (O-DU), the O-DU configured to:

receive configuration capability information from a radio unit (O-RU) via management plane (M-Plane) messaging;

receive a request to reconfigure an antenna array of the O-RU from a higher-layer network function, the request being based on monitored at least one network parameter, over an O1 interface, for implementing a dynamical antenna array reconfiguration;

based on the configuration capability information from the O-RU and based on the request to reconfigure the antenna array of the O-RU from the higher-layer network function, determine an antenna array configuration supported by the O-RU; and activate the supported antenna array configuration via control plane (C-Plane) messaging while the O-RU is processing radio signals.

4. The apparatus as claimed in claim 3, wherein the O-DU is configured to:

activate the supported antenna array configuration via the management plane (M-Plane) messaging while the O-RU is processing radio signals.

5. The apparatus as claimed in claim 3, wherein the supported antenna array configuration is at least one of a configuration for implementing a TRx Control and a configuration for implementing at least one of sleep mode, wherein the configuration for implementing the at least one of sleep mode comprising at least one of a configuration for implementing an Advanced Sleep Mode and Deep Sleep.

6. An apparatus comprising:

a radio unit (O-RU), the O-RU configured to:

send, to a distributed unit (O-DU), configuration capability information via management plane (M-Plane) messaging;

receive, from the O-DU, an antenna array configuration supported by the O-RU via control plane (C-Plane) messaging, wherein the supported antenna array configuration is based on the configuration capability information of the O-RU and a request to reconfigure the antenna array from the higher-layer network function, the request being based on monitored at least one network parameter, over an O1 interface, for implementing a dynamical antenna array reconfiguration; and based on the supported antenna array configuration for the O-RU, reconfigure the antenna array configuration of the O-RU while the O-RU is processing radio signals.

7. The apparatus as claimed in claim 6, wherein the O-RU is further configured to:

receive, from the higher-layer network function, the request to reconfigure the antenna array via a management plane Fronthaul (FH M-Plane) Interface; and based on the request to reconfigure the antenna array from the higher-layer network function, reconfigure the antenna array configuration of the O-RU while the O-RU is processing radio signals.

8. The apparatus as claimed in claim 7, wherein the O-RU is further configured to:

receive, from the O-DU, an antenna array configuration supported by the O-RU via management plane (M-Plane) messaging, wherein the supported antenna array configuration is based on the configuration capability information of the O-RU and a request to reconfigure an antenna array from a higher-layer network function.

9. The apparatus as claimed in claim 6, wherein the O-RU is further configured to: notify a configuration change from one antenna array configuration to another antenna array configuration via management plane (M-Plane) messaging.

10. A method comprising:

monitoring, by a higher-layer network function of an open radio access network (O-RAN), for implementing a dynamical antenna array reconfiguration, at least one network parameter via an O1 interface; and based on the monitored at least one network parameter satisfying a predetermined condition, requesting, by the higher-layer network function, a distributed unit (O-DU) to reconfigure an antenna array of a radio unit (O-RU) while the O-RU is processing radio signals.

11. The method as claimed in claim 10, requesting, by the higher-layer network function, based on the monitored at least one network parameter satisfying a predetermined condition, a radio unit (O-RU) to reconfigure an antenna array via a management plane Fronthaul (FH M-Plane) while the O-RU is processing radio signals.

12. A method comprising:

receiving, by a distributed unit (O-DU), configuration capability information from a radio unit (O-RU) via management plane (M-Plane) messaging;

receiving, by the O-DU, a request to reconfigure an antenna array from a higher-layer network function, the request being based on monitored at least one network parameter, over an O1 interface, for implementing a dynamical antenna array reconfiguration;

based on the configuration capability information from the O-RU and based on the request to reconfigure the antenna array from the higher-layer network function, determining,-, by the O-DU, an antenna array configuration supported by the O-RU; and activating, by the O-DU, the supported antenna array configuration via control plane (C-Plane) messaging while the O-RU is processing radio signals.

13. The method as claimed in claim 12, wherein the method further comprises:

activating, by the O-DU, the supported antenna array configuration via the management plane (M-Plane) messaging while the O-RU is processing radio signals.

14. The method as claimed in claim 12, wherein the supported antenna array configuration is at least one of a configuration for implementing a TRx Control and a configuration for implementing at least one of sleep mode, wherein the configuration for implementing the at least one of sleep mode comprising at least one of a configuration for implementing an Advanced Sleep Mode and Deep Sleep.

15. A method comprising:

sending, by a radio unit (O-RU) to a distributed unit (O-DU), configuration capability information via management plane (M-Plane) messaging;

receiving, by the O-RU from the O-DU, an antenna array configuration supported by the O-RU via control plane (C-Plane) messaging, wherein the supported antenna array configuration is based on the configuration capability information of the O-RU and a request to reconfigure the antenna array from the higher-layer network function, the request being based on monitored at least one network parameter, over an O1 interface, for implementing a dynamical antenna array reconfiguration; and based on the supported antenna array configuration for the O-RU, reconfiguring, by the O-RU, the antenna array configuration of the O-RU while the O-RU is processing radio signals.

16. The method as claimed in claim 15, wherein the method further comprises:

receiving, by the O-RU from the higher-layer network function, the request to reconfigure the antenna array via a management plane Fronthaul (FH M-Plane) Interface; and based on the request to reconfigure the antenna array from the higher-layer network function, reconfigure the antenna array configuration of the O-RU while the O-RU is processing radio signals.

17. The method as claimed in claim 15, wherein the method further comprises:

receiving, from the O-DU, an antenna array configuration supported by the O-RU via management plane (M-Plane) messaging, wherein the supported antenna array configuration is based on the configuration capability information of the O-RU and a request to reconfigure an antenna array from a higher-layer network function.

18. The method as claimed in claim 15, wherein the supported antenna array configuration is at least one of a configuration for implementing a TRx Control and a configuration for implementing at least one of sleep mode, wherein the configuration for implementing the at least one of sleep mode comprising at least one of a configuration for implementing an Advanced Sleep Mode and Deep Sleep.

19. The method as claimed in claim 15, wherein the method further comprises:

notifying, by the O-RU, a configuration change from one antenna array configuration to another antenna array configuration via management plane (M-Plane) messaging.

20. The method as claimed in claim 15, wherein the method further comprises:

upon initializing, sending, by the O-RU, configuration capability information via management plane (M-Plane) messaging.

* * * * *